(12) United States Patent
Li et al.

(10) Patent No.: US 12,542,654 B2
(45) Date of Patent: Feb. 3, 2026

(54) COMMUNICATION METHOD AND APPARATUS

(71) Applicant: Huawei Technologies Co., Ltd., Shenzhen (CN)

(72) Inventors: Yong Li, Darmstadt (DE); Yong Wang, Shenzhen (CN); Jing Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 248 days.

(21) Appl. No.: 18/324,474

(22) Filed: May 26, 2023

(65) Prior Publication Data

US 2023/0327857 A1 Oct. 12, 2023

Related U.S. Application Data

(63) Continuation of application No. PCT/CN2020/132533, filed on Nov. 28, 2020.

(51) Int. Cl.
*H04L 9/08* (2006.01)
*H04L 9/32* (2006.01)

(52) U.S. Cl.
CPC .......... *H04L 9/0825* (2013.01); *H04L 9/0894* (2013.01); *H04L 9/3247* (2013.01)

(58) Field of Classification Search
CPC .... H04L 9/0825; H04L 9/0894; H04L 9/3247

USPC .......................................................... 713/171
See application file for complete search history.

(56) References Cited

U.S. PATENT DOCUMENTS

| 10,873,464 B2 * | 12/2020 | Muhanna | .................. H04L 9/14 |
| 11,489,821 B2 * | 11/2022 | Zee | ......................... H04L 9/083 |
| 2019/0141524 A1 * | 5/2019 | Wang | .................... H04L 9/3247 |

FOREIGN PATENT DOCUMENTS

| CN | 110958607 A | * | 4/2020 | ........... H04L 9/3247 |
| CN | 111107071 A | | 5/2020 | |

OTHER PUBLICATIONS

Jian Wang et al., "A Simple and Efficient Security Scheme for Vehicular Ad Hoc Networks," Proceedings of the IC-NIDC, Nov. 6, 2009, pp. 591-595.

* cited by examiner

*Primary Examiner* — Moeen Khan
(74) *Attorney, Agent, or Firm* — Conley Rose, P.C.

(57) ABSTRACT

A communication method includes: sending a first public key and a signature of the first public key; receiving first information from a second node, where the first information includes an identification (ID) ciphertext; decrypting the ID ciphertext based on a first private key corresponding to the first public key, to obtain an ID of the second node; and sending second information to the second node, where the second information includes a temporary ID corresponding to the second node, and the temporary ID is used to temporarily indicate an identity of the second node.

14 Claims, 12 Drawing Sheets

COMMUNICATION METHOD AND APPARATUS

CROSS-REFERENCE TO RELATED APPLICATIONS

This application is a continuation of International Patent Application No. PCT/CN2020/132533 filed on Nov. 28, 2020, the disclosure of which is hereby incorporated by reference in its entirety.

TECHNICAL FIELD

The present disclosure relates to the fields of communication technologies and connected vehicles, and in particular, to the field of short-range wireless communication technologies, for example, cockpit domain communication, and specifically, to a communication method and apparatus.

BACKGROUND

With continuous development of society, communication technologies and applications are in full swing. Intelligent terminals based on wireless communication technologies, such as intelligent transportation devices, smart home devices, and robots, are gradually entering people's daily life.

In a communication system, when a node (referred to as a second node for ease of description) accesses another node (referred to as a first node for ease of description), both nodes need to indicate their identities to each other. Sending, by the second node, its identification (ID) to the first node is a common manner of indicating, by the second node, its identity to the first node.

However, a real identity of a node is usually associated with privacy and data security in the node. For example, an attacker may trace, based on an identity of a node, a location of a user or obtain a service recently processed by a terminal, causing leakage of privacy, personal data, and the like of the user. For example, an attacker detects, at 10:00 at a location A, that a node with an ID "N" is performing a video uploading service, and further detects, at 10:30 at a location B, that the node with the ID "N" is performing an update service. In this way, the attacker can know that the node with the ID "N" moves from the location A to the location B at 10:00 to 10:30, and therefore can collect a moving track of the node with the ID "N", causing leakage of user privacy.

Therefore, an identity of a node (e.g., an ID of the node) needs to be kept secret to prevent an attacker from obtaining a real identity of a user.

SUMMARY

Embodiments of the present disclosure provide a communication method and apparatus, to avoid leakage of a real ID of a node and improve data security.

According to a first aspect, an embodiment of the present disclosure provides a communication method, including: sending a first public key and a signature of the first public key; receiving first information from a second node, where the first information includes an identification ID ciphertext, and the ID ciphertext corresponds to the first public key and an ID of the second node; decrypting the ID ciphertext based on a first private key corresponding to the first public key, to obtain the ID of the second node; and sending second information to the second node, where the second information includes a temporary ID corresponding to the second node, and the temporary ID is used to temporarily indicate an identity of the second node. Further, the communication method may be applied to a first node.

The ID of the second node is a permanent ID (also referred to as a real ID or a fixed ID) of the second node. For example, an International Mobile Equipment Identity (IMEI) of a mobile phone terminal may be understood as a permanent ID of the mobile phone terminal. An identity of a node may be identified by a permanent ID.

In this embodiment of the present disclosure, the second node may protect the ID by using the first public key to obtain the ID ciphertext, so that the real ID is not directly transmitted, and a source and integrity of the first public key may be protected by using the signature of the first public key. Further, the second node may verify the first public key based on the signature of the first public key, and then transmit the ID by "using a public key for encryption and using a private key for decryption". In this way, the real ID of the second node can be obtained by decrypting the ID ciphertext. During subsequent communication, a temporary ID may be used to indicate an identity of the second node, to avoid leakage of the real ID of the node and improve data security.

During specific implementation, the first information may also be referred to as association request information (which may also be referred to as an association request message in a specific scenario), and the second information may also be referred to as association establishment information (which may also be referred to as an association establishment message in a specific scenario).

In a possible implementation of the first aspect, the first public key is a temporary public key, and the first private key is a temporary private key.

The temporary key (including the temporary public key and the temporary private key) is a short-term key. The temporary key may be specifically a key with a short lifetime, for example, a key with a lifetime of 1 hour. Alternatively, the temporary key may be a key that can be used to perform encryption a few times, for example, a key that can be used to perform encryption only once, or a key used to encrypt only data units with sequence numbers 1 to 100.

It can be learned that a lifetime of the temporary key is usually short, and the temporary key is less likely to be cracked compared with a long-term key. Therefore, the real ID can be encrypted by using the temporary public key to improve secrecy of the real ID. In addition, because a long-term key is usually used for a long period of time, all communication data that uses the long-term key is affected when the long-term key is cracked, without forward secrecy. However, because the temporary key usually has a short lifetime, security of communication data that appears before the temporary key is used is not affected even if the temporary key is cracked. This improves data security.

In another possible implementation of the first aspect, the first public key is a one-time public key, and the first private key is a one-time private key.

It can be learned that the first public key and the first private key used in this embodiment of the present disclosure may be one-time keys, that is, are used to encrypt and decrypt only the ID. For example, after the ID ciphertext is decrypted by using the first private key, the first private key may be deleted, so that the private key is not likely to be cracked. This avoids leakage of the real ID of the node and improves data security.

In another possible implementation of the first aspect, the first public key is signed based on a private key corresponding to a digital certificate (DC), to obtain the signature of the first public key; and the DC is sent to the second node.

The digital certificate (which may also be referred to as a security certificate) is a digital certificate that identifies an identity, and is an authoritative and impartial certificate issued by a certificate authority (CA) center.

It can be learned that the DC can be used to verify a source of the first public key. For example, the certificate authority center generates a DC for a public key PK and some information (e.g., description information of the first node) of the first node, and the second node may determine that the source of the first public key is the first node based on a key pair (that is, a private key SK corresponding to the public key PK) corresponding to the DC and in by "using a private key for signing and using a public key for signature verification".

In a specific implementation, the first node has a long-term key pair (a long-term public key PK and a long-term private key SK). The CA center performs certification on the long-term public key PK, and the CA center encrypts the long-term public key PK together with some related information (e.g., description information of the first node) by using a private key cpk of the CA center to generate a DC. The first node generates a signature of the first public key by using a private key corresponding to the certificate, and sends the first public key, the signature of the first public key, and the DC to the second node. The second node decrypts the certificate by using a public key csk of the CA center, and may determine that the DC is issued by the CA, and determine that the long-term public key PK in the DC is a public key of the first node. In this way, the second node authenticates a source of the long-term public key PK. The second node verifies the signature of the first public key by using the long-term public key, and determines that the first public key comes from the first node, and therefore encrypts the ID by using the first public key.

In another possible implementation of the first aspect, the first information further includes first indication information, and the first indication information indicates that the association request information includes the ID ciphertext.

Optionally, the first indication information may be a first field included in the first information. For example, a value "0" of the first field indicates that the first information includes the ID ciphertext. In this way, the first node can determine, by parsing the first information, whether to perform a step of decrypting the ID ciphertext. Further, a value "1" of the first field indicates that the first information includes the temporary ID. For another example, the first information may include an ID type, and the ID type may be one or more of an ID ciphertext, a temporary ID, and the like.

In another possible implementation of the first aspect, the method further includes: determining that identity authentication on the second node succeeds; and allocating the temporary ID to the second node.

In another possible implementation of the first aspect, the first information further includes a first key agreement parameter, and the determining that identity authentication on the second node succeeds includes: determining a first key based on the first key agreement parameter and a key agreement algorithm; sending third information to the second node, where the third information includes first identity authentication information and a second key agreement parameter, and the first identity authentication information is used for identity authentication on the first node; receiving fourth information from the second node, where the fourth information includes second identity authentication information; and determining, based on the second identity authentication information, that identity authentication on the second node succeeds.

It can be learned that the first key may be generated through key agreement, the first identity authentication information is generated by using the first key, and the first identity authentication information is used by the second node to verify an identity. Further, the identity of the second node may alternatively be verified by using the second identity authentication information. When an attacker attempts to use the identification of the second node, the attacker cannot forge the first key and therefore cannot pass identity verification. This avoids communication with an untrusted node and improves data security of the node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation of the first aspect, the method further includes: receiving fifth information from the second node, where the fifth information indicates that association is completed, and further, the fifth information may be referred to as association complete information (which may also be referred to as an association complete message in a specific scenario).

According to a second aspect, an embodiment of the present disclosure provides a communication method. The method may be further applied to a first node, and includes: receiving first information from a second node, where the first information includes an identification ID ciphertext, and the ID ciphertext corresponds to a first protection key and an ID of the second node; determining the first protection key based on a security parameter, where the security parameter is a pre-shared key PSK between a first node and the second node or a first password of the first node; decrypting the ID ciphertext based on the first protection key to obtain the ID of the second node; and sending second information to the second node, where the second information includes a temporary ID corresponding to the second node, and the temporary ID is used to temporarily indicate an identity of the second node. Further, the communication method may be applied to the first node.

The PSK is a secrecy value shared by the first node and the second node. It can be learned that the PSK shared with the first node is predefined, preconfigured, or pre-generated in the second node. Therefore, a real ID may be encrypted by using the PSK. Correspondingly, the ID ciphertext may be decrypted based on the PSK to obtain the real ID of the second node, so as to determine an identity of the second node. During subsequent communication, a temporary ID may be used to indicate an identity of the second node, to avoid leakage of the real ID of the node and improve data security.

The first password of the first node may be considered as an access password of the first node, and may be specifically a password preconfigured or predefined in the first node to enable the second node to access the first node, or a secrecy value agreed upon between the first node and the second node. For example, in a scenario in which a mobile phone accesses a router that supports the wireless fidelity (Wi-Fi) protocol, the mobile phone terminal may access the router by using a "Wi-Fi password", and the "Wi-Fi password" may be understood as a first password of the router.

It can be learned that the second node may encrypt the ID of the second node based on the first password, so that the ID of the second node can be obtained by decrypting the ID ciphertext based on the first password. A node that obtains the first password is usually trusted, and therefore communication security can be ensured. During subsequent communication, a temporary ID may be used to indicate an identity of the second node, to avoid leakage of the real ID of the node and improve data security.

During specific implementation, the first information may also be referred to as association request information (which may also be referred to as an association request message in a specific scenario), and the second information may also be referred to as association establishment information (which may also be referred to as an association establishment message in a specific scenario).

In a possible implementation of the second aspect, the determining the first protection key based on a security parameter includes: determining the first protection key based on the security parameter and a first freshness parameter.

The foregoing describes a decryption method. Because the first protection key used for decryption corresponds to a first protection key used for encryption, the first protection key used for encryption is also generated based on the security parameter and the first freshness parameter. In an encryption process, because a value of the freshness parameter varies at different moments, a first protection key for encrypting an ID of the first node varies each time. This improves secrecy of a group key.

In another possible implementation of the second aspect, the determining the first protection key based on a security parameter includes: determining the first protection key based on the security parameter and a cryptographic algorithm.

In another possible implementation of the second aspect, the cryptographic algorithm includes at least a hash algorithm and/or a key derivation function (KDF). For example, the first protection key K1 is obtained based on a password PW of the first node by using the hash algorithm. Specifically, for example, K1=hash(PW). For another example, the first protection key K1 is obtained based on a hash value of a password PW of the first node and the first freshness parameter fresh1 by using the KDF. Specifically, for example, K1=KDF(hash(PW, fresh1)).

In another possible implementation of the second aspect, the first freshness parameter is a first nonce.

In another possible implementation of the second aspect, the security parameter is the pre-shared key PSK between the first node and the second node, and the PSK corresponds to a first PSK ID. Further, the first information further includes the first PSK ID.

In another possible implementation of the second aspect, the security parameter is the first password of the first node, and the first password corresponds to a first password ID. Further, the first information further includes the first password ID.

In another possible implementation of the second aspect, the first information further includes first indication information, and the first indication information indicates that the association request information includes the ID ciphertext.

In another possible implementation of the second aspect, the method further includes: determining that identity authentication on the second node succeeds; and allocating the temporary ID to the second node.

In another possible implementation of the second aspect, the first information further includes a first key agreement parameter, and the determining that identity authentication on the second node succeeds includes: determining a first key based on the first key agreement parameter and a key agreement algorithm; sending third information to the second node, where the third information includes first identity authentication information and a second key agreement parameter, and the first identity authentication information is used for identity authentication on the first node; receiving fourth information from the second node, where the fourth information includes second identity authentication information; and determining, based on the first key and the second identity authentication information, that identity authentication on the second node succeeds.

It can be learned that the first key may be generated through key agreement, the first identity authentication information is generated by using the first key, and the first identity authentication information is used by the second node to verify an identity. Further, the identity of the second node may alternatively be verified by using the second identity authentication information. When an attacker attempts to use the identification of the second node, the attacker cannot forge the first key and therefore cannot pass identity verification. This avoids communication with an untrusted node and improves data security of the node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation of the second aspect, the method further includes: receiving fifth information from the second node, where the fifth information indicates that association is completed, and further, the fifth information may be referred to as association complete information (which may also be referred to as an association complete message in a specific scenario).

According to a third aspect, an embodiment of the present disclosure provides a communication method. The method may be further applied to a second node, and includes: receiving a first public key and a signature of the first public key from a first node; determining, based on the signature of the first public key, that integrity verification on the first public key succeeds; sending first information to the first node, where the first information includes an identification ID ciphertext, and the ID ciphertext is obtained by encrypting an ID of the second node by using the first protection key; and receiving second information (association establishment information) from the first node, where the second information includes a temporary ID corresponding to the ID of the second node, and the temporary ID is used to temporarily indicate an identity of the second node.

In this embodiment of the present disclosure, the ID may be protected by using the first public key to obtain the ID ciphertext, so that a real ID is not directly transmitted, and a source and integrity of the first public key may be protected by using the signature of the first public key. Further, the first public key may be verified based on the signature of the first public key, and then the ID is transmitted by "using a public key for encryption and using a private key for decryption". In this way, the first node can obtain the real ID of the second node by decrypting the ID ciphertext. During subsequent communication, a temporary ID may be used to indicate an identity of the second node, to avoid leakage of the real ID of the node and improve data security.

During specific implementation, the first information may also be referred to as association request information (which may also be referred to as an association request message in a specific scenario), and the second information may also be referred to as association establishment information (which may also be referred to as an association establishment message in a specific scenario).

In a possible implementation of the third aspect, the first public key is a temporary public key.

In another possible implementation of the third aspect, the first public key is a one-time public key.

In another possible implementation of the third aspect, the determining, based on the signature of the one-time public key, that verification on the one-time public key succeeds includes: receiving a digital certificate DC from the first node; and determining, based on the signature of the first public key and a public key corresponding to the DC, that verification on the first public key succeeds.

In another possible implementation of the third aspect, the first information further includes first indication information, and the first indication information indicates that the association request includes the ID ciphertext.

In another possible implementation of the third aspect, the method further includes: receiving third information from the first node, where the third information includes first identity authentication information and a second key agreement algorithm parameter; determining a first key based on the second key agreement algorithm parameter and a key agreement algorithm; determining, based on the first key and the first identity authentication information, that identity authentication on the first node succeeds; and sending fourth information to the first node, where the fourth information includes second identity authentication information, and the second identity authentication information is used to authenticate an identity of the second node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation of the third aspect, the method further includes: sending fifth information to the first node, where the fifth information indicates that association is completed, and further, the fifth information may be referred to as association complete information (which may also be referred to as an association complete message in a specific scenario).

According to a fourth aspect, an embodiment of the present disclosure provides a communication method. The method may be further applied to a second node, and includes: determining a first protection key based on a security parameter, where the security parameter is a pre-shared key PSK between a first node and a second node or a first password of the first node; encrypting an identification ID of the second node based on the first protection key to obtain an ID ciphertext; sending first information to the first node, where the first information includes the identification ID ciphertext, and the ID ciphertext is obtained by encrypting the ID of the second node by using the first protection key; and receiving second information from the first node, where the second information includes a temporary ID corresponding to the second node, and the temporary ID is used to temporarily indicate an identity of the second node.

The PSK is a secrecy value shared by the first node and the second node. It can be learned that the PSK shared with the first node is predefined, preconfigured, or pre-generated in the second node. Therefore, a real ID may be encrypted by using the PSK. Correspondingly, the first node may decrypt the ID ciphertext based on the PSK to obtain the real ID of the second node, so as to determine the identity of the second node. During subsequent communication, a temporary ID may be used to indicate an identity of the second node, to avoid leakage of the real ID of the node and improve data security.

The first password of the first node may be considered as an access password of the first node, and may be specifically a password preconfigured in the first node to enable the second node to access the first node, or a secrecy value agreed upon between the first node and the second node. For example, in a scenario in which a mobile phone accesses a router that supports the Wi-Fi protocol, the mobile phone terminal may access the router by using a "Wi-Fi password", and the "Wi-Fi password" may be understood as a first password of the router.

It can be learned that the second node may encrypt the ID of the second node based on the first password, so that the ID of the second node can be obtained by decrypting the ID ciphertext based on the first password. A node that obtains the first password is usually trusted, and therefore communication security can be ensured. During subsequent communication, a temporary ID may be used to indicate an identity of the second node, to avoid leakage of the real ID of the node and improve data security.

In a possible implementation of the fourth aspect, the determining the first protection key based on a security parameter includes: determining the first protection key based on the security parameter and a first freshness parameter.

In another possible implementation of the fourth aspect, the determining the first protection key based on a security parameter includes: determining the first protection key based on the security parameter and a cryptographic algorithm.

In another possible implementation of the fourth aspect, the cryptographic algorithm includes at least a hash algorithm and/or a KDF. For example, the first protection key K1 is obtained based on a password PW of the first node by using the hash algorithm. Specifically, for example, K1=hash(PW). For another example, the first protection key K1 is obtained based on a hash value of a password PW of the first node and the first freshness parameter fresh1 by using the KDF. Specifically, for example, K1=KDF(hash (PW, fresh1)).

In another possible implementation of the fourth aspect, the first freshness parameter is a first nonce.

In another possible implementation of the fourth aspect, the security parameter is the pre-shared key PSK between the first node and the second node, and the PSK corresponds to a first PSK ID. Further, the first information further includes the first PSK ID.

In another possible implementation of the fourth aspect, the security parameter is the first password of the first node, and the first password corresponds to a first password ID. Further, the first information further includes the first password ID.

In another possible implementation of the fourth aspect, the first information further includes first indication information, and the first indication information indicates that the association request includes the ID ciphertext.

In another possible implementation of the fourth aspect, the method further includes: receiving third information from the first node, where the third information includes first identity authentication information and a second key agreement algorithm parameter; determining a first key based on the second key agreement algorithm parameter and a key agreement algorithm; determining, based on the first key and the first identity authentication information, that identity authentication on the first node succeeds; and sending fourth information to the first node, where the fourth information includes second identity authentication information, and the second identity authentication information is used to authenticate an identity of the second node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation of the fourth aspect, the method further includes: sending fifth information to the first node, where the fifth information indicates that association is completed, and further, the fifth information may be referred to as association complete information (which may also be referred to as an association complete message in a specific scenario).

According to a fifth aspect, an embodiment of the present disclosure provides a communication apparatus. The communication apparatus includes units configured to perform the method according to any one of the first aspect or the possible implementations of the first aspect.

In a possible implementation of the fifth aspect, the communication apparatus includes: a sending unit configured to send a first public key and a signature of the first public key; a receiving unit configured to receive first information (association request information) from a second node (a T node), where the first information includes an identification ID ciphertext, and the ID ciphertext corresponds to the first public key and the ID of the second node; and a processing unit configured to decrypt the ID ciphertext based on a first private key corresponding to the first public key, to obtain the ID of the second node, where the sending unit is further configured to send second information (association establishment information) to the second node, where the second information includes a temporary ID corresponding to the second node, and the temporary ID is used to temporarily indicate an identity of the second node.

In this embodiment of the present disclosure, the second node may protect the ID by using the first public key to obtain the ID ciphertext, so that the real ID is not directly transmitted, and a source and integrity of the first public key may be protected by using the signature of the first public key. Further, the second node may verify the first public key based on the signature of the first public key, and then transmit the ID by "using a public key for encryption and using a private key for decryption". In this way, the communication apparatus can obtain the real ID of the second node by decrypting the ID ciphertext. During subsequent communication, a temporary ID may be used to indicate an identity of the second node, to avoid leakage of the real ID of the node and improve data security.

In another possible implementation of the fifth aspect, the first public key is a temporary public key, and the first private key is a temporary private key.

It can be learned that a lifetime of the temporary key is usually short, and the temporary key is less likely to be cracked compared with a long-term key. Therefore, the real ID can be encrypted by using the temporary public key to improve secrecy of the real ID. In addition, because a long-term key is usually used for a long period of time, all communication data that uses the key is affected when the long-term key is cracked, without forward secrecy. However, because the temporary key usually has a short lifetime, security of communication data that appears before the temporary key is used is not affected even if the temporary key is cracked. This improves data security.

In another possible implementation of the fifth aspect, the first public key is a one-time public key, and the first private key is a one-time private key.

It can be learned that the first public key and the first private key used in this embodiment of the present disclosure may be one-time keys, that is, are used to encrypt and decrypt only the ID. For example, after the ID ciphertext is decrypted by using the first private key, the first private key may be deleted, so that the private key is not likely to be cracked. This avoids leakage of the real ID of the node and improves data security.

In another possible implementation of the fifth aspect, the processing unit is further configured to sign the first public key based on a private key corresponding to a DC, to obtain the signature of the first public key; and the sending unit is further configured to send the DC to the second node.

It can be learned that the DC can be used to verify a source of the first public key. For example, the certificate authority center generates a DC for a public key PK and some information (e.g., description information of the first node) of the first node, and the second node may determine that the source of the first public key is the first node based on a key pair (that is, a private key SK corresponding to the public key PK) corresponding to the DC and by "using a private key for signing and using a public key for signature verification".

In a specific implementation, the first node has a long-term key pair (a long-term public key PK and a long-term private key SK). The CA center performs certification on the long-term public key PK, and the CA center encrypts the long-term public key PK together with some related information (e.g., description information of the first node) by using a private key cpk of the CA center to generate a DC. The first node generates a signature of the first public key by using a private key corresponding to the certificate, and sends the first public key, the signature of the first public key, and the DC to the second node. The second node decrypts the certificate by using a public key csk of the CA center, and may determine that the DC is issued by the CA, and determine that the long-term public key PK in the DC is a public key of the first node. In this way, the second node authenticates a source of the long-term public key PK. The second node verifies the signature of the first public key by using the long-term public key, and determines that the first public key comes from the first node, and therefore encrypts the ID by using the first public key.

In another possible implementation of the fifth aspect, the first information further includes first indication information, and the first indication information indicates that the association request information includes the ID ciphertext.

In another possible implementation of the fifth aspect, the processing unit is further configured to: determine that identity authentication on the second node succeeds; and allocate the temporary ID to the second node.

In another possible implementation of the fifth aspect, the first information further includes a first key agreement parameter, and the processing unit is further configured to determine a first key based on the first key agreement parameter and a key agreement algorithm; the sending unit is further configured to send third information to the second node, where the third information includes first identity authentication information and a second key agreement parameter, and the first identity authentication information is used for identity authentication on the first node; the receiving unit is further configured to receive fourth information from the second node, where the fourth information includes second identity authentication information; and the processing unit is further configured to determine, based on the first key and the second identity authentication information, that identity authentication on the second node succeeds.

It can be learned that the communication apparatus may generate the first key through key agreement, and generate the first identity authentication information by using the first key, where the first identity authentication information is used by the second node to verify an identity. Further, the communication apparatus may alternatively verify the identity of the second node by using the second identity authentication information. When an attacker attempts to use the identification of the second node, the attacker cannot forge the first key and therefore cannot pass identity verification. This avoids communication with an untrusted node and improves data security of the node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation of the fifth aspect, the receiving unit is further configured to receive fifth information from the second node, where the fifth information indicates that association is completed, and further, the fifth information may be referred to as association complete information (which may also be referred to as an association complete message in a specific scenario).

According to a sixth aspect, an embodiment of the present disclosure provides a communication apparatus. The communication apparatus includes units configured to perform the method according to any one of the possible implementations of the first aspect or the second aspect.

In a possible implementation of the sixth aspect, the communication apparatus includes: a receiving unit configured to receive first information from a second node, where the first information includes an identification ID ciphertext, and the ID ciphertext corresponds to a first protection key and an ID of the second node; a processing unit configured to determine the first protection key based on a security parameter, where the security parameter is a pre-shared key PSK between a first node and the second node or a first password of the first node, where the processing unit is further configured to decrypt the ID ciphertext based on the first protection key to obtain the ID of the second node; and a sending unit configured to send second information to the second node, where the second information includes a temporary ID corresponding to the second node, and the temporary ID is used to temporarily indicate an identity of the second node.

It can be learned that the PSK shared with the first node is predefined, preconfigured, or pre-generated in the second node. Therefore, a real ID may be encrypted by using the PSK. Correspondingly, the communication apparatus may decrypt the ID ciphertext based on the PSK to obtain the real ID of the second node, so as to determine the identity of the second node. During subsequent communication, a temporary ID may be used to indicate an identity of the second node, to avoid leakage of the real ID of the node and improve data security.

The first password of the first node may be considered as an access password of the first node, and may be specifically a password preconfigured or predefined in the first node to enable the second node to access the first node, or a secrecy value agreed upon between the first node and the second node. For example, in a scenario in which a mobile phone accesses a router that supports the Wi-Fi protocol, the mobile phone terminal may access the router by using a "Wi-Fi password", and the "Wi-Fi password" may be understood as a first password of the router.

It can be learned that the second node may encrypt the ID of the second node based on the first password, so that the ID of the second node can be obtained by decrypting the ID ciphertext based on the first password. A node that obtains the first password is usually trusted, and therefore communication security can be ensured. During subsequent communication, a temporary ID may be used to indicate an identity of the second node, to avoid leakage of the real ID of the node and improve data security.

In another possible implementation of the sixth aspect, the processing unit is further configured to: determine the first protection key based on the security parameter and a first freshness parameter.

The foregoing describes a decryption method. Because the first protection key used for decryption corresponds to a first protection key used for encryption, the first protection key used for encryption is also generated based on the security parameter and the first freshness parameter. In an encryption process, because a value of the freshness parameter varies at different moments, a first protection key for encrypting an ID of the first node varies each time. This improves secrecy of a group key.

In another possible implementation of the sixth aspect, the processing unit is further configured to: determine the first protection key based on the security parameter and a cryptographic algorithm.

In another possible implementation of the sixth aspect, the cryptographic algorithm includes at least a hash algorithm and/or a KDF. For example, the first protection key K1 is obtained based on a password PW of the first node by using the hash algorithm. Specifically, for example, K1=hash (PW). For another example, the first protection key K1 is obtained based on a hash value of a password PW of the first node and the first freshness parameter fresh1 by using the KDF. Specifically, for example, K1=KDF(hash(PW, fresh1)).

In another possible implementation of the sixth aspect, the first freshness parameter is a first nonce.

In another possible implementation of the sixth aspect, the security parameter is the pre-shared key PSK between the first node and the second node, the PSK corresponds to a first PSK ID, and the first information further includes the first PSK ID.

In another possible implementation of the sixth aspect, the first information further includes first indication information, and the first indication information indicates that the association request information includes the ID ciphertext.

In another possible implementation of the sixth aspect, the processing unit is further configured to: determine that identity authentication on the second node succeeds; and allocate the temporary ID to the second node.

In another possible implementation of the sixth aspect, the first information further includes a first key agreement parameter, and the processing unit is further configured to determine a first key based on the first key agreement parameter and a key agreement algorithm; the sending unit is further configured to send third information to the second node, where the third information includes first identity authentication information and a second key agreement parameter, and the first identity authentication information is used for identity authentication on the first node; the receiving unit is further configured to receive fourth information from the second node, where the fourth information includes second identity authentication information; and the processing unit is further configured to determine, based on the first key and the second identity authentication information, that identity authentication on the second node succeeds.

It can be learned that the communication apparatus may generate the first key through key agreement, and generate the first identity authentication information by using the first key, where the first identity authentication information is used by the second node to verify an identity. Further, the communication apparatus may alternatively verify the identity of the second node by using the second identity authentication information. When an attacker attempts to use the identification of the second node, the attacker cannot forge the first key and therefore cannot pass identity verification. This avoids communication with an untrusted node and improves data security of the node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation of the sixth aspect, the receiving unit is further configured to receive fifth information from the second node, where the fifth information indicates that association is completed, and further, the fifth information may be referred to as association complete information (which may also be referred to as an association complete message in a specific scenario).

According to a seventh aspect, an embodiment of the present disclosure provides a communication apparatus. The communication apparatus includes units configured to perform the method according to any one of the possible implementations of the first aspect or the third aspect.

In a possible implementation of the seventh aspect, the communication apparatus includes: a receiving unit configured to receive a first public key and a signature of the first public key from a first node; a processing unit configured to determine, based on the signature of the first public key, that integrity verification on the first public key succeeds; and a sending unit configured to send first information to the first node, where the first information includes an identification ID ciphertext, and the ID ciphertext is obtained by encrypting an ID of a second node by using a first protection key, where the receiving unit is further configured to receive second information (association establishment information) from the first node, where the second information includes a temporary ID corresponding to the ID of the second node, and the temporary ID is used to temporarily indicate an identity of the second node.

In this embodiment of the present disclosure, the apparatus may protect the ID by using the first public key to obtain the ID ciphertext, so that a real ID is not directly transmitted, and a source and integrity of the first public key may be protected by using the signature of the first public key. Further, the apparatus may verify the first public key based on the signature of the first public key, and then transmit the ID by "using a public key for encryption and using a private key for decryption". In this way, the first node can obtain the real ID of the second node by decrypting the ID ciphertext. During subsequent communication, a temporary ID may be used to indicate an identity of the second node, to avoid leakage of the real ID of the node and improve data security.

During specific implementation, the first information may also be referred to as association request information (which may also be referred to as an association request message in a specific scenario), and the second information may also be referred to as association establishment information (which may also be referred to as an association establishment message in a specific scenario).

In a possible implementation of the seventh aspect, the first public key is a temporary public key.

In another possible implementation of the seventh aspect, the first public key is a one-time public key.

In another possible implementation of the seventh aspect, the receiving unit is further configured to receive a digital certificate DC from the first node; and the processing unit is further configured to determine, based on the signature of the first public key and a public key corresponding to the DC, that verification on the first public key succeeds.

In another possible implementation of the seventh aspect, the first information further includes first indication information, and the first indication information indicates that the association request includes the ID ciphertext.

In another possible implementation of the seventh aspect, the receiving unit is further configured to receive third information from the first node, where the third information includes first identity authentication information and a second key agreement algorithm parameter; the processing unit is further configured to determine a first key based on the second key agreement algorithm parameter and a key agreement algorithm; the processing unit is further configured to determine, based on the first key and the first identity authentication information, that identity authentication on the first node succeeds; and the sending unit is further configured to send fourth information to the first node, where the fourth information includes second identity authentication information, and the second identity authentication information is used to authenticate an identity of the second node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation of the seventh aspect, the sending unit is further configured to send fifth information to the first node, where the fifth information indicates that association is completed, and further, the fifth information may be referred to as association complete information (which may also be referred to as an association complete message in a specific scenario).

According to an eighth aspect, an embodiment of the present disclosure provides a communication apparatus. The communication apparatus includes units configured to perform the method according to any one of the possible implementations of the first aspect or the fourth aspect.

In a possible implementation of the eighth aspect, the communication apparatus includes: a processing unit configured to determine a first protection key based on a security parameter, where the security parameter is a pre-shared key PSK between a first node and a second node or a first password of the first node, where the processing unit is further configured to encrypt an identification ID of the second node based on the first protection key to obtain an ID ciphertext; a sending unit configured to send first information to the first node, where the first information includes the identification ID ciphertext, and the ID ciphertext is obtained by encrypting the ID of the second node by using the first protection key; and a receiving unit configured to receive second information from the first node, where the second information includes a temporary ID corresponding to the second node, and the temporary ID is used to temporarily indicate an identity of the second node.

It can be learned that the PSK shared with the first node is predefined, preconfigured, or pre-generated in the second node. Therefore, the communication apparatus may encrypt a real ID by using the PSK. Correspondingly, the first node may decrypt the ID ciphertext based on the PSK to obtain the real ID of the second node, so as to determine the identity of the second node. During subsequent communication, a temporary ID may be used to indicate an identity of the second node, to avoid leakage of the real ID of the node and improve data security.

In a possible implementation of the eighth aspect, the processing unit is further configured to: determine the first protection key based on the security parameter and a first freshness parameter.

In another possible implementation of the eighth aspect, the processing unit is further configured to: determine the first protection key based on the security parameter and a cryptographic algorithm.

In another possible implementation of the eighth aspect, the cryptographic algorithm includes at least a hash algorithm and/or a KDF. For example, the first protection key K1 is obtained based on a password PW of the first node by using the hash algorithm. Specifically, for example, K1=hash(PW). For another example, the first protection key K1 is obtained based on a hash value of a password PW of the first node and the first freshness parameter fresh1 by using the KDF. Specifically, for example, K1=KDF(hash (PW, fresh1)).

In another possible implementation of the eighth aspect, the first freshness parameter is a first nonce.

In another possible implementation of the eighth aspect, the security parameter is the pre-shared key PSK between the first node and the second node, the PSK corresponds to a first PSK ID, and the first information further includes the first PSK ID.

In another possible implementation of the eighth aspect, the first information further includes first indication information, and the first indication information indicates that the association request includes the ID ciphertext.

In another possible implementation of the eighth aspect, the receiving unit is further configured to receive third information from the first node, where the third information includes first identity authentication information and a second key agreement algorithm parameter; the processing unit is further configured to determine a first key based on the second key agreement algorithm parameter and a key agreement algorithm; the processing unit is further configured to determine, based on the first key and the first identity authentication information, that identity authentication on the first node succeeds; and the sending unit is further configured to send fourth information to the first node, where the fourth information includes second identity authentication information, and the second identity authentication information is used to authenticate an identity of the second node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation of the eighth aspect, the sending unit is further configured to send fifth information to the first node, where the fifth information indicates that association is completed, and further, the fifth information may be referred to as association complete information (which may also be referred to as an association complete message in a specific scenario).

According to a ninth aspect, an embodiment of the present disclosure provides a communication apparatus, including at least one processor and a communication interface. The at least one processor is configured to invoke a computer program stored in at least one memory, so that the communication apparatus implements the method according to any one of the first aspect or the possible implementations of the first aspect, or implements the method according to any one of the second aspect or the possible implementations of the second aspect.

According to a tenth aspect, an embodiment of the present disclosure provides a chip system. The chip system includes at least one processor and a communication interface. The at least one processor is configured to invoke a computer program stored in at least one memory, so that an apparatus in which the chip system is located implements the method according to any one of the first aspect or the possible implementations of the first aspect, or implements the method according to any one of the second aspect or the possible implementations of the second aspect.

According to an eleventh aspect, an embodiment of the present disclosure further provides an information transmission system. The information transmission system includes a first node and a second node. The first node includes the communication apparatus according to any one of the third aspect or the possible implementations of the third aspect. The second node includes the communication apparatus according to any one of the fourth aspect or the possible implementations of the fourth aspect.

According to a twelfth aspect, an embodiment of the present disclosure discloses a computer-readable storage medium. The computer-readable storage medium stores a computer program. When the computer program runs on one or more processors, the method according to any one of the first aspect or the possible implementations of the first aspect is implemented, or the method according to any one of the second aspect or the possible implementations of the second aspect is implemented, or the method according to any one of the third aspect or the possible implementations of the third aspect is implemented, or the method according to any one of the fourth aspect or the possible implementations of the fourth aspect is implemented.

According to a thirteenth aspect, an embodiment of the present disclosure discloses a computer program product. When the computer program product runs on one or more processors, the method according to any one of the first aspect or the possible implementations of the first aspect is implemented, or the method according to any one of the second aspect or the possible implementations of the second aspect is implemented, or the method according to any one of the third aspect or the possible implementations of the third aspect is implemented, or the method according to any one of the fourth aspect or the possible implementations of the fourth aspect is implemented.

According to a fourteenth aspect, an embodiment of the present disclosure discloses a terminal. The terminal may be an intelligent cockpit domain product, a vehicle, or the like. The terminal includes a first node and/or a second node. The first node (e.g., one or more of modules such as a camera, a screen, a microphone, a speaker, a radar, an electronic key, a passive entry passive start system controller, and user equipment (UE)) includes the apparatus according to any one of the third aspect or the possible implementations of the third aspect. The second node (e.g., a base station or a vehicle cockpit domain controller (CDC)) includes the communication apparatus according to any one of the fourth aspect or the possible implementations of the fourth aspect. Alternatively, the vehicle may be replaced with an intelligent terminal like an uncrewed aerial vehicle or a robot, or a transportation tool.

BRIEF DESCRIPTION OF DRAWINGS

The following describes accompanying drawings used in embodiments of the present disclosure.

DESCRIPTION OF EMBODIMENTS

Figure 1:
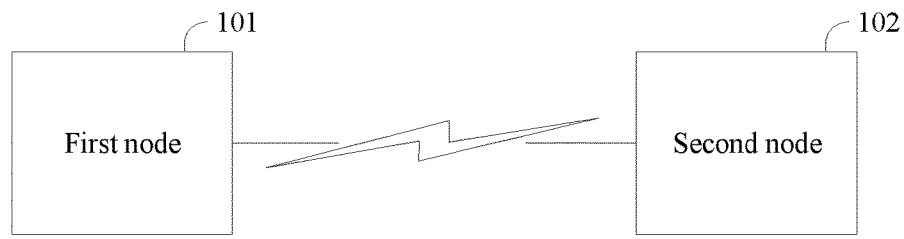
FIG. 1 is a schematic diagram of an architecture of a communication system according to an embodiment of the present disclosure.

The following describes embodiments of the present disclosure with reference to accompanying drawings in embodiments of the present disclosure. In this application, the terms such as "example" or "for example" are used to represent giving an example, an illustration, or descriptions. Any embodiment or design scheme described by using "example" or "for example" in this application should not be construed as being more preferred or having more advantages than another embodiment or design scheme. Use of the terms such as "example" or "for example" is intended to present a related concept in a specific manner.

For ease of understanding, the following first briefly describes related technologies and technical terms used in this application.

1. Node

The node is an electronic device with a data processing and sending/receiving capability, and may include a terminal device or a network side device. For example, the node may be a vehicle cockpit domain device, or a module in a vehicle cockpit domain device (e.g., one or more of modules such as a CDC), a camera, a screen, a microphone, a speaker, an electronic key, and a passive entry passive start system controller). During specific implementation, the node may alternatively be a data transfer device, for example, a base station, a router, a repeater, a bridge, or a switch; or may be a terminal device, for example, various types of terminal devices such as UE, a mobile phone, a tablet computer (pad), a desktop computer, a headset, and a speaker; or may include a machine intelligence device like a self-driving device, a transportation safety device, a virtual reality (VR) terminal device, an augmented reality (AR) terminal device, a machine type communication (MTC) device, an industrial control device, a remote medical device, a smart grid device, or a smart city device; or may include a wearable device (e.g., a smart watch, a smart band, or a pedometer), or the like.

In some technical scenarios, a device with a similar data sending/receiving capability may alternatively not be referred to as a node. However, for ease of description, electronic devices with a data sending/receiving capability are collectively referred to as nodes in embodiments of the present disclosure.

2. Cryptographic Algorithm

The cryptographic algorithm may be a mathematical function used for one or more of encryption, decryption, key generation, password derivation, and the like, and may also be referred to as a cryptographic function. Common cryptographic algorithms include a hash algorithm, an encryption algorithm, an authentication algorithm, a KDF, an authentication algorithm, and the like.

(1) Hash Algorithm

The hash algorithm is also referred to as a hash function or a hashing algorithm. The hash algorithm may be used to convert information of any length into an identifier, and it is quite difficult to find a regularity of reversion.

(2) Encryption Algorithm

The encryption algorithm includes a symmetric encryption algorithm and an asymmetric encryption algorithm. Usually, an encryption key and a decryption key of the symmetric encryption algorithm are the same, and an encryption key and a decryption key of the asymmetric encryption algorithm are different. In addition, there is another type of hash algorithm that does not require a key. Common symmetric encryption algorithms include a data encryption standard (DES), a triple data encryption standard (3DES), an advanced encryption standard (AES), and the like. Common asymmetric algorithms include an RSA encryption algorithm, a data structure analysis (DSA) algorithm, and the like. Hash algorithms include a secure hash algorithm (SHA-1), a message digest (MD) algorithm (e.g., MD2, MD4, or MD5), and the like.

(3) Integrity Protection Algorithm

The integrity protection algorithm is an algorithm for protecting integrity of a message, and may also be referred to as a MAC (MAC) algorithm or an integrity-protection algorithm. For example, an integrity protection algorithm implemented by using a hash algorithm is referred to as a hash-based message authentication code (HMAC) algorithm. The hash algorithm may be one of MD5, SHA-1, SHA-256, and the like. These different HMAC implementations are generally denoted as HMAC-MD5, HMAC-SHA1, HMAC-SHA256, and the like.

In some specific scenarios, an authentication encryption algorithm may be used to encrypt data or generate a message authentication code for a given original text. Therefore, the authentication encryption algorithm may serve as an encryption algorithm or an integrity protection algorithm. For example, an AES algorithm based on a GMAC and counter encryption mode (AES-Galois/counter mode, AES-GCM), an AES algorithm based on a CMAC and counter encryption mode (AES-CMAC/counter Mode, AES-CCM), or the like may be used to authenticate and encrypt a message. During authentication and encryption, a MAC can be generated to protect integrity of the message.

(4) Key Derivation Algorithm

The key derivation algorithm is used to derive one or more secrecy values from a secrecy value, and is also referred to as a key deduction algorithm. For example, a new secrecy value DK derived from a secrecy value Key may be expressed as follows: DK=KDF(Key). Common key derivation algorithms include a password-based key derivation function (PBKDF), a scrypt algorithm, and the like. The PBKDF algorithm further includes a first-generation PBKDF1 and a second-generation PBKDF2. Optionally, during key derivation in some KDF algorithms, a hash algorithm is used to hash an input secrecy value. Therefore, the KDF functions may further receive an algorithm identifier as an input, where the algorithm identifier indicates a hash algorithm to be used.

(5) Key Agreement Algorithm

Key agreement is a process in which both communication entities exchange some parameters to obtain a key through agreement. An algorithm used for key agreement is referred to as a key agreement algorithm or a key exchange algorithm. Common key agreement algorithms include a Diffie-Hellman (DH) algorithm, an elliptic curve cryptography (ECC)-based Diffie-Hellman (ECDH) algorithm, an Oakley algorithm, an encryption algorithm approved by the State Password Administration Committee Office (e.g., SM1, SM2, SM3, or SM4), and the like.

The DH algorithm is used as an example. Two nodes use a prime p and a nonce g with large values to respectively generate a nonce a and a nonce b. A first node sends a value A (A=ga mod p) generated by the ath power of g mod p to a second node. The second node sends a value B (B=gb mod p) generated by the bth power of g mod p to the first node. Then the first node calculates the ath power of a received result (K=Ba mod p), and the second node calculates the bth power of a received result (K=Ab mod p). Because K=Ab mod p=(ga mod p)b mod p=gab mod p=(gb mod p)a mod p=Ba mod p, the first node and the second node obtain a same key K through calculation.

In this case, assume that an attacker attempts to calculate a by using A, g, and p and based on the following formula: a=log gA mod p. Because there is no algorithm for fast calculation in a logarithmic operation and values of the prime p and the nonce g are usually large, the attacker can hardly calculate a by using A, the prime p, and the nonce g through a logarithmic operation and a modulo operation. Therefore, the key K obtained by using the DH algorithm is secure.

3. Freshness Parameter

The freshness parameter is used to generate a key, an authentication parameter, and the like, and may also be referred to as a fresh degree parameter or a fresh parameter. The freshness parameter may include at least one of a nonce (number once, NONCE), a counter, a serial number, a sequence number, and the like. The nonce is a random value used only once (in other words, is non-repetitive). Freshness parameters generated at different moments are usually different. To be specific, a specific value of a freshness parameter changes each time a freshness parameter is generated. Therefore, a freshness parameter used to generate a key (or an authentication parameter, or the like) this time is different from a freshness parameter used to generate a key (or an authentication parameter, or the like) last time. This can improve security of the generated key.

For example, the freshness parameter may be a nonce obtained by a node by using a random number generator.

4. Digital Certificate

The digital certificate (which may also be referred to as a security certificate) is a digital certificate that identifies an identity, and is an authoritative and impartial certificate issued by a CA center.

For example, a first node has a long-term key pair (a long-term public key PK and a long-term private key SK). The CA center performs certification on the long-term public key PK, and the CA center encrypts the long-term public key PK together with some related information (e.g., description information of the first node) by using a private key cpk of the CA center to generate a DC. The first node generates a signature (that is, a "private key signature") of a first public key by using a private key corresponding to the certificate, and sends the first public key, the signature of the first public key, and the DC to a second node. The second node decrypts the certificate by using a public key csk of the CA center, and may determine that the DC is issued by the CA, and determine that the long-term public key PK in the DC is a public key of the first node. In this way, the second node authenticates a source of the long-term public key PK. The second node verifies the signature of the first public key by using the long-term public key PK (that is, "uses a public key for signature verification"), to determine that the first public key comes from the first node.

In addition, it should be noted that "authentication", "check", and "verification" mentioned in embodiments of the present disclosure may mean checking correctness or appropriateness. In embodiments of the present disclosure, "association" indicates a process of establishing a connection between a first node and a second node. In some specific technical scenarios, "association" may also be described as "access".

The following describes a system architecture and a service scenario in embodiments of the present disclosure. It should be noted that the system architecture and the service scenario described in this application are intended to describe technical solutions in this application more clearly, and do not constitute a limitation on technical solutions provided in this application. A person of ordinary skill in the art may know that technical solutions provided in this application are also applicable to a similar technical problem with evolution of the system architecture and emergence of a new service scenario.

FIG. 1 is a schematic diagram of a possible communication system according to an embodiment of the present disclosure. The communication system includes a first node 101 and a second node 102. The first node 101 may communicate with the second node 102. A link for communication between the first node 101 and the second node 102 may include various types of connection media, including a wired link (e.g., an optical fiber), a wireless link, a combination of a wired link and a wireless link, or the like. For example, a short-range connection technology may be used, including 802.11b/g, Bluetooth, Zigbee, a radio frequency identification (RFID) technology, an ultra-wideband (UWB) technology, a short-range wireless communication system (e.g., a vehicle-mounted short-range wireless communication system), and the like. For another example, a long-range connection technology may alternatively be used, including radio access technologies such as a Global System for Mobile Communications (GSM), a general packet radio service (GPRS), and a universal mobile telecommunications system (UMTS).

Certainly, another wireless communication technology may alternatively be used to support communication between the first node 101 and the second node 102. In some specific implementation scenarios, the second node 102 may also be referred to as a C node or a control node, and the first node 101 may also be referred to as a T node or a terminal. A communication link from the C node to the T node may be referred to as a C link, and a communication link from the T node to the C node may be referred to as a T link.

The second node 102 may request to be associated with the first node 101. During association, the second node 102 needs to indicate its identity to the first node 101. Usually, the second node 102 may send an ID of the second node 102 to the first node 101 to indicate the identity of the second node 102 to the first node 101. However, a real identity of a node (e.g., the first node 101 or the second node 102) is usually associated with privacy and data security in the node. Theft of an ID of the node leads to leakage of privacy, personal data, and the like of a user.

Figure 2:
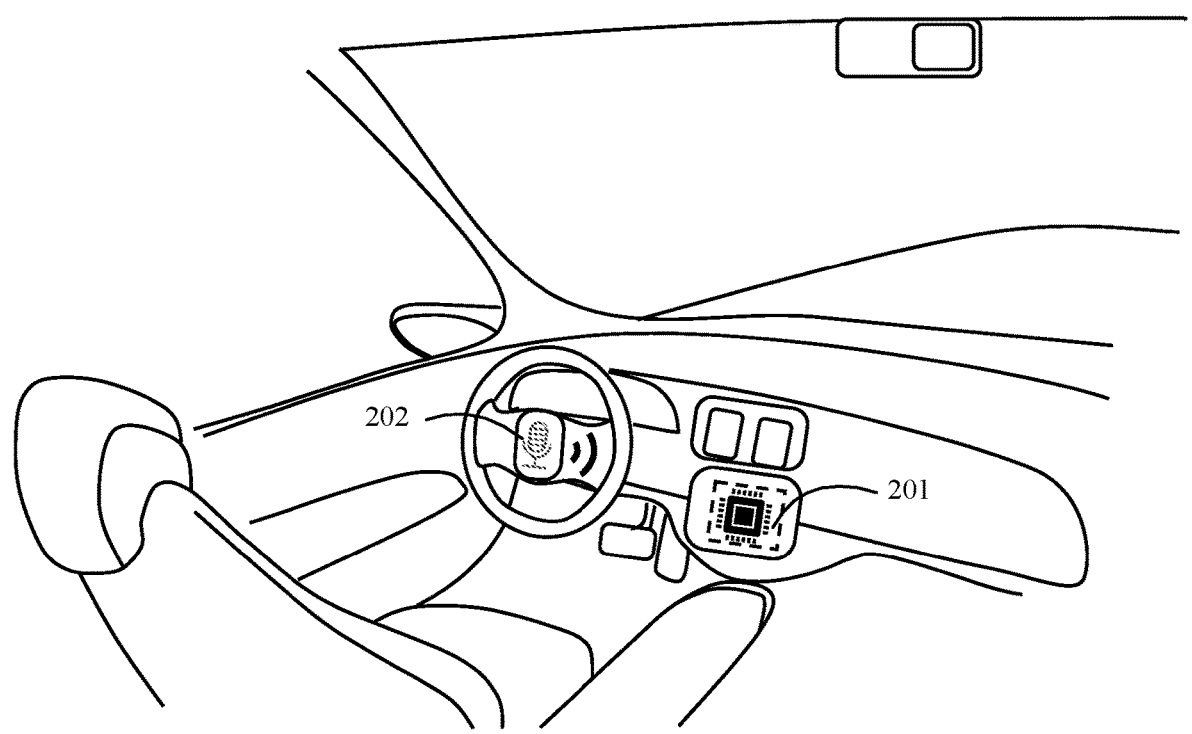
FIG. 2 is a schematic diagram of an application scenario of a communication method according to an embodiment of the present disclosure.

For example, FIG. 2 is a schematic diagram of a wireless communication scenario in a vehicle according to an embodiment of the present disclosure. A cockpit domain controller (CDC) 201 in the vehicle is a control center of an intelligent cockpit domain device, and may be considered as the first node 101. A microphone 202 supporting a wireless communication technology in the vehicle may be considered as the second node 102. The microphone 202 may communicate with the CDC 201. However, both nodes need to identify each other's identity during communication. In this case, if the microphone 202 communicates with the CDC 201 by using a permanent ID of the microphone 202, an attacker may listen to the microphone 202 and obtain privacy of a user (e.g., an owner of the vehicle) based on the ID. For example, the attacker detects, at 10:00 at a location A, that the microphone 202 is performing an audio upload service, and further detects, at 10:30 at a location B, that the microphone 202 is performing an update service. In this way, the attacker can know that the microphone 202 moves from the location A to the location B at 10:00 to 10:30, and therefore can collect a moving track of the microphone 202. As a result, a location and a moving track of the vehicle are exposed. The attacker may even record a time period in which the microphone 202 is active, and the like, leading to leakage of user privacy.

Figure 3:
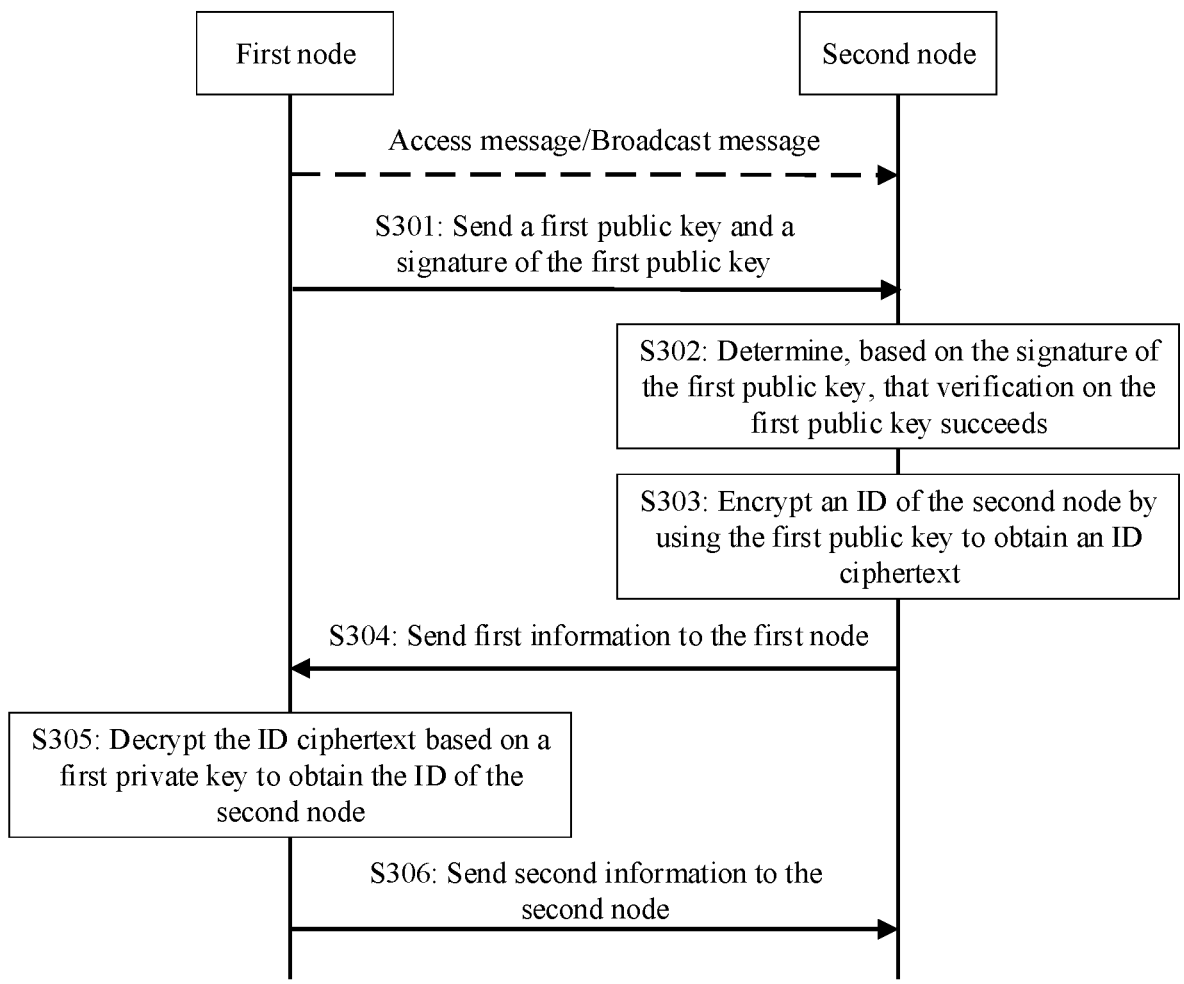
FIG. 3 is a schematic flowchart of a communication method according to an embodiment of the present disclosure.

FIG. 3 is a schematic flowchart of a communication method according to an embodiment of the present disclosure. Further, the method may be implemented based on the architecture shown in FIG. 1. The method includes at least the following steps.

Step S301: A first node sends a first public key and a signature of the first public key.

Specifically, the first public key and a first private key are a key pair. A ciphertext obtained through encryption by using the first public key may be decrypted by using the first private key, and a ciphertext obtained through encryption by using the first private key may be decrypted by using the first public key. Usually, the first public key is open to the public and therefore is referred to as a public key, and the first private key is kept secret and therefore is referred to as a private key.

Optionally, the first public key may be a temporary public key. For example, the first node determines a temporary key pair, and the temporary key pair includes a temporary public key and a first temporary private key. The temporary key (including the temporary public key and the temporary private key) is a short-term key, and may be specifically a key with a short lifetime, for example, a key with a lifetime of 1 hour, or may be a key that can be used to perform encryption a few times, for example, a key that can be used to perform encryption only once, or a key used to encrypt only data units with sequence numbers 1 to 100. A lifetime of the temporary key pair is not specifically limited in this application.

Further, optionally, the first public key and the first private key are one-time keys, that is, keys that are usually used only once or that become invalid or are deleted after being used once. For example, after data A is encrypted by using a first public key OTpk, the first public key OTpk is deleted; and after the data A is decrypted by using a first private key OTsk, the first private key OTsk may be deleted. In this way, the first public key may be used for encryption only once, and the first private key may be used for decryption only once, so that the first private key is not likely to be cracked. This improves data security.

The signature of the first public key may be used to verify the first public key.

Specifically, the signature of the first public key may be obtained by signing the first public key based on a private key corresponding to a digital certificate (DC, which may also be referred to as a certificate). For example, a public key PK (which may be a long-term public key or a temporary public key) of the first node is signed by using a private key of a certificate authority (CA) center to obtain a certificate DC. The first node signs the first public key by using a private key SK corresponding to the PK in the certificate DC, to obtain a signature S of the first public key. Subsequently, a second node may verify the signature S by using the public key in the certificate DC, to determine that the first public key comes from the first node. For example, the first public key is OTpk, and S=Sign(SK, OTpk). Sign indicates a digital signature algorithm.

The first node may send the first public key and the signature of the first public key to the second node in a unicast mode, or may send the first public key and the signature of the first public key in a broadcast or multicast mode. Correspondingly, the second node receives the first public key and the signature of the first public key from the first node. Optionally, the first node may further send the DC, and correspondingly, the second node receives the DC from the first node.

Optionally, the first node may send access information to the second node in a unicast mode, or send access information in a multicast mode, or send broadcast information in a broadcast mode. In the unicast mode, only one sender and one receiver are usually included. Specifically, in the unicast mode, a destination address of a sent data unit is an address of an interface of the receiver. For example, the first node sends the access information to the second node in the unicast mode, where a data unit carrying the access information includes an Internet Protocol (IP) address of the second node and/or a media access control (MAC) address of the second node. In the multicast (also referred to as groupcast in some scenarios) mode, one sender and a group of specified receivers are usually included. Specifically, in the multicast, a destination address of a sent data unit is a multicast address (the multicast address may identify addresses of a group of interfaces, which are reserved class D addresses in some scenarios). The data unit sent to the multicast address is sent to the group of interfaces identified by the address. In the broadcast mode, one sender and all receivers in a subnet are usually included. A broadcast address is an address specially used for simultaneously performing sending to all workstations in a network. Specifically, in the broadcast mode, a destination address of a sent data unit is a broadcast address. For example, in a network based on the Transmission Control Protocol/Internet Protocol (TCP/IP), an IP address whose host identifier (ID) segment is all 1s is a broadcast address, and a data unit sent to the broadcast address is sent to all nodes corresponding to the host ID segment. For example, a broadcast address for a network segment 10.1.1.0 (255.255.255.0) is 10.1.1.255 (255 indicates 11111111 in a binary system). When a data unit whose destination address is 10.1.1.255 is sent, the data unit is distributed to all nodes in the network segment.

Further, optionally, the access information or the broadcast information includes the first public key and the signature of the first public key, and may further include one or more of the DC, an identification of the first node, description information of the first node, information used to indicate access of another node, and the like.

In a possible design, the first public key and the first private key may be determined by the first node. For example, the first node may periodically or aperiodically generate a key pair (including the first public key and the first private key). During specific implementation, there may be at least the following several possible cases.

Case 1: The first node may determine one or more key pairs, and determine an identifier of the key pair. The second node may encrypt data by using a first public key in any one of the one or more key pairs to obtain a ciphertext, and sending, to the first node, the ciphertext together with an identifier of the key pair corresponding to the used first public key. For example, the first node may generate a key pair aperiodically (e.g., based on a configuration or according to a requirement) or periodically (e.g., every 10 minutes or predefined duration), and configure an identifier of the key pair. For another example, the first node may determine a key pair each time the first node receives a response from the second node. Further, the first node may further determine an identifier of the key pair, or determine the key pair by determining an identifier of the key pair. Because a key used by the second node may be any one of a plurality of previously received first public keys, the second node sends the identifier of the key pair together with a ciphertext obtained through encryption by using the first public key, so that the first node determines, based on the identifier of the key pair, a first private key to be used to decrypt the ciphertext.

Case 2: The first node determines a key pair (or may further determine an identifier of the key pair) for the second node, and sends a first public key in the key pair and/or the identifier of the key pair to the second node. The second node encrypts data by using the first public key in the key pair. Because the key pair is determined by the first node for the second node, when receiving a ciphertext from the second node, the first node decrypts the ciphertext by using a first private key in the key pair.

For example, the first node may send broadcast information, where the broadcast information includes an identifier or an address of the first node, description information of the first node, or the like. The second node sends response information to the first node based on the broadcast information. The first node receives the response information, determines a key pair for the second node, and sends a first public key in the key pair to the second node. When subsequently receiving a ciphertext from the second node, the first node may decrypt the ciphertext by using a first private key in the key pair determined for the second node. Further, the response information may include an IP address of the second node. The first node sends the first public key to the second node based on the IP address. When subsequently receiving a ciphertext from the IP address, the first node may decrypt the ciphertext by using the first private key.

For another example, the first node determines a key pair and an identifier of the key pair for the second node. The key pair and the identifier of the key pair may be stored in a third-party device (e.g., a server, a key distribution center, or another device). The first node sends the identifier of the key pair to the second node, and the second node may obtain a first public key in the key pair from the third-party device based on the identifier of the key pair.

Case 3: The first node determines one or more key pairs, sends a first public key in the key pair in a broadcast, multicast, or unicast mode, and when receiving a ciphertext from the second node, encrypts the ciphertext by using a latest first private key (that is, a time at which the key is determined is closest to a current time). Further, when it is determined that there are a plurality of key pairs, the key pairs may have a specific validity period or lifetime. When an old key pair expires, a new key pair is used.

Step S302: The second node determines, based on the signature of the first public key, that verification on the first public key succeeds.

Specifically, the second node may determine, based on the signature of the first public key, that the first public key comes from the first node, and/or determine that integrity verification on the first public key succeeds.

In a possible implementation, the second node obtains the certificate DC, and the second node verifies the certificate based on the CA center. If the verification succeeds, the second node verifies the signature of the first public key based on a public key corresponding to the certificate. If the verification on the signature of the first public key succeeds, the second node determines that the first public key comes from the first node and is not tampered with (that is, the integrity verification succeeds).

Step S303: The second node encrypts an ID of the second node by using the first public key to obtain an ID ciphertext.

The ID of the second node is a permanent ID (also referred to as a real ID or a fixed ID) of the second node. For example, an IMEI of a mobile phone terminal may be understood as a permanent ID of the mobile phone terminal. An identity of a node may be identified by a permanent ID. For another example, the permanent ID of the second node may alternatively be a MAC address of the second node, a device ID of the second node, or another identifier, character string, or address capable of identifying the second node.

For example, the first public key is a one-time public key OTpk. The second node encrypts the ID (the permanent ID) of the second node by using the first public key OTpk to obtain an ID ciphertext IDc. For example, IDc=Enc(OTpk, ID), where Enc indicates an encryption algorithm. Further, optionally, the encryption algorithm may be pre-agreed upon by the first node and the second node, or may be sent by the first node to the second node by using indication information (e.g., the encryption algorithm is carried in access information or broadcast information), or may be predefined in a protocol or a standard.

Step S304: The second node sends first information to the first node.

Specifically, the first information includes the ID ciphertext. The second node sends the first information to the first node, and correspondingly, the first node receives the first information from the second node.

Optionally, the first information may further include a first key agreement parameter (in some scenarios, the key agreement parameter may also be understood as a public key in a key agreement process), and the first key agreement parameter may be generated based on a key agreement algorithm, or may be obtained based on a preconfigured or predefined calculation method.

Optionally, when the first public key corresponds to an identifier of a key pair, the first information further includes the identifier of the key pair corresponding to the first public key, so that the first node determines the first private key based on the identifier of the key pair.

Further, optionally, the first information further includes a freshness parameter (referred to as a first freshness parameter for ease of description). The first freshness parameter may include at least one of a nonce, a counter, a serial number, a sequence number, and the like. For example, the first freshness parameter may be a nonce NONCEe determined by the second node.

Optionally, the first information further includes first indication information, and the first indication information indicates that the association request information includes the ID ciphertext. Optionally, the first indication information may be a first field included in the first information. For example, a value "0" of the first field indicates that the first information includes the ID ciphertext. In this way, the first node can determine, by parsing the first information, whether to perform a step of decrypting the ID ciphertext. Further, a value "1" of the first field indicates that the first information includes the temporary ID. For another example, the first information may include an ID type, and the ID type may be one or more of an ID ciphertext, a temporary ID, and the like.

Optionally, the first information further includes a PSK ID, and the PSK ID is an ID corresponding to a PSK shared by the first node and the second node. Further, the PSK ID may be used to determine a PSK. In other words, the PSK ID is in a one-to-one correspondence with the PSK.

Optionally, during specific implementation, the first information may also be referred to as association request information (which may also be referred to as an association request message in a specific scenario), or may be referred to as access request information (or an access request message). A name of a message or information is not limited in this application, and is merely used an example for description and expression. The name may be randomly replaced.

Step S305: The first node decrypts the ID ciphertext based on the first private key to obtain the ID of the second node.

Specifically, the first public key and the first private key are a key pair. Therefore, a ciphertext obtained through encryption by using the first public key may be decrypted by using the first private key.

For example, the first private key is a one-time private key OTsk. The first node decrypts the ID ciphertext IDc by using the first private key OTsk to obtain the ID (the permanent ID) of the second node. For example, ID=Dec(OTsk, IDc), where Dec indicates a decryption algorithm corresponding to the encryption algorithm (the encryption algorithm and the decryption algorithm are usually a same algorithm, and different names are used herein for ease of description).

Step S306: The first node sends second information to the second node.

Specifically, the second information includes a temporary ID allocated to the second node. The temporary ID is used to temporarily indicate an identity of the second node. For example, information subsequently sent by the second node to the first node may carry the temporary ID, and the first node may determine, based on the temporary ID, that the information comes from the second node.

The temporarily indicating may mean that the temporary ID is used to indicate the identity of the second node within a period of time, or the temporary ID is used to indicate the identity of the second node in a specific communication process, or the ID is used to indicate the identity of the second node during processing of a specific service. There may be at least the following implementations.

Implementation 1: The first node adds a temporary ID of the second node to the second information, where the temporary ID has a validity period, or the temporary ID has a specific lifetime and/or a specific quantity of times of being used. For example, the temporary ID may have a lifetime of 1 hour, or may be used to send and/or receive 1000 data units. For example, the lifetime of the temporary ID starts from a time 10:00:00 at which the second information is sent, and the temporary ID may temporarily indicate an identity of the second node at 10:00:00 to 11:00:00. When the time 11:00:00 arrives, the first node may send a new temporary ID to the second node, to indicate an identity of the second node in a next hour.

Implementation 2: The first node adds a temporary ID of the second node to the second information, where the temporary ID is to be used in a specific communication period. For example, the second node requests to be associated with the first node, and the first node sends a temporary ID to the second node. In this case, during the current association between the first node and the second node, the temporary ID is used to indicate an identity of the second node during communication. The temporary ID becomes invalid when the association is terminated. During next association, the first node re-sends a new temporary ID.

Implementation 3: The first node adds a temporary ID of the second node to the second information, where the temporary ID is used by the second node to process a first service. Optionally, the first node may alternatively send a plurality of temporary IDs to a node that processes a plurality of services in parallel. For example, the temporary ID is used by the second node to temporarily indicate an identity of the second node when the second node performs a video upload service, and when the second node performs a software upgrade, another temporary ID is used to indicate an identity of the second node.

Optionally, the first node may allocate a temporary ID to the second node, and send the temporary ID to the second node by using the second information. Further, a correspondence between the ID (the permanent ID) of the second node and the temporary ID may be further stored, and the correspondence is deleted or cleared after the temporary ID becomes invalid.

Optionally, the first node may determine that an identity of the second node is trusted, and allocate (in other words, determine) a temporary ID to the second node. The temporary ID may be allocated by using a fixed algorithm, or may be randomly allocated. For example, a length and/or a format (e.g., including one or more of a digit, an uppercase letter, a lowercase letter, and the like) of a temporary ID are/is predefined or preset by the first node or specified in a protocol, and the first node randomly allocates a temporary ID to the second node based on the length and/or the format.

Further, the first node may determine, in a plurality of manners, that an identity of the second node is trusted, for example, in at least the following two manners.

Manner 1: A pre-shared key PSK between the first node and the second node is preconfigured or pre-obtained in the second node and the first node. The second node may encrypt a piece of information by using the PSK (e.g., the first information may be encrypted, or one or more of identity check information, description information of the second node, a piece of predefined test information, or the like is encrypted). The first node receives a piece of encrypted information, and decrypts the information by using the PSK shared with the second node. If the first node can successfully obtain the information through decryption, it is determined that an identity of the second node is trusted.

Manner 2: The second node generates second identity authentication information, and the first node authenticates an identity of the second node based on the second identity authentication information (e.g., the first node generates check information check1 in a same manner, and if the check1 is the same as the second identity authentication information, it indicates that the authentication succeeds). If the authentication succeeds, it is determined that an identity of the second node is trusted.

In a possible design, a PSK between the first node and the second node is preconfigured or pre-obtained in the second node and the first node, and the first node and the second node determine a first key by using a key agreement algorithm. The first node generates, based on the PSK and/or the first key, a second key (or referred to as an identity authentication key Kauth) used for identity authentication. Correspondingly, the second node generates, based on the PSK and/or the first key, a second key used for identity authentication.

Specifically, the first node may generate first identity authentication information based on the second key, and the first identity authentication information may be sent to the second node, so that the second node verifies an identity of the first node based on the second key and the first identity authentication information. The second node may generate second identity authentication information based on the second key, and the second identity authentication information may be sent to the first node, so that the first node verifies an identity of the second node based on the second key and the second identity authentication information.

In a possible design, the first node may send third information to the second node. The third information carries first identity authentication information AUTHa. The first identity authentication information AUTHa is generated based on a second key Kauth and other information. The other information includes one or more of the first information, some parameters (e.g., the first freshness parameter NONCEe) in the first information, some parameters in the third information, and the like.

For example, AUTHa=KDF(Kauth, the first information, NONCEe, several parameters in the third information), where the first information, the NONCEe, and the several parameters in the third information are optional parameters. Correspondingly, after receiving the third information, the second node generates a check value check2 in a same manner. For example, check2=KDF(Kauth, the first information, NONCEe, several parameters in the third information), where the first information, the NONCEe, and the several parameters in the third information are optional parameters (parameters are the same as the parameters used by the first node during generation). If the check value check2 is the same as the first identity authentication information AUTHa, the second node may determine that an identity of the first node is trusted.

In another possible design, the second node may send fourth information to the first node. The fourth information carries second identity authentication information AUTHe. The second identity authentication information AUTHe is generated based on a second key Kauth and other information. The other information includes one or more of the first information, some parameters (e.g., the first freshness parameter NONCEe) in the first information, the third information, some parameters (e.g., a second freshness parameter NONCEa) in the third information, some parameters in the fourth information, and the like. For example, AUTHe=KDF(Kauth, the first information, NONCEe, the third information, NONCEa, several parameters in the fourth information), where the first information, the NONCEe, the third information, the NONCEa, and the several parameters in the fourth information are optional parameters. Correspondingly, after receiving the fourth information, the first node generates a check value check1 in a same manner. For example, check1=KDF(Kauth, the first information, NONCEe, the third information, NONCEa, some parameters in the fourth information), where parameters for generating the check value check1 are the same as the parameters used by the second node to generate the AUTHe. If the check value check1 is the same as the second identity authentication information AUTHe, the first node may determine that an identity of the second node is trusted.

In the plurality of designs in the manner 2, the second key Kauth may be generated by using the KDF and based on the first key Kdh and/or the PSK and one or more of the first freshness parameter NONCEe, the second freshness parameter NONCEa, the ID of the first node, the ID of the second node, a key identifier, and the like. The key identifier is a predefined or preconfigured identifier used to indicate a type of a key to be generated, and may be a character string, a number, or the like.

For example, the second key Kauth is generated according to the following formula: Kauth=KDF(Kdh|PSK, NONCEe, NONCEa, IDa, IDe, "authentication"), where "|" may indicate concatenation of character strings (this is merely an example, and the character strings may alternatively not be concatenated during specific implementation, for example, are separately used as two input parameters), IDa indicates the ID of the first node, IDe indicates the ID of the second node, and the "authentication" is an optional key identifier.

Alternatively, the first key Kdh may be replaced with a key Kgt derived based on the first key Kdh. For example, Kgt=KDF(Kdh, NONCEe, NONCEa), or Kgt=KDF(Kdh, fresh), where fresh indicates a freshness parameter, so that Kgt derived based on Kdh each time varies. Further, the second key Kauth is generated according to the following formula: Kauth=KDF(Kgt∥PSK, NONCEe, NONCEa, IDa, IDe, "authentication"), where IDa, IDe, and "authentication" are optional parameters. For specific meanings, refer to the foregoing descriptions. It should be noted that how to obtain the key Kgt is explained by using two steps herein to more clearly describe the solution. During actual processing, the key Kgt may alternatively be obtained in one step. The key Kgt is merely an intermediate result, that is, the second key Kauth is determined according to the following formula: Kauth=KDF(KDF(Kdh, fresh)∥PSK, NONCEe, NONCEa, IDa, IDe, "authentication").

During specific implementation, the first information may also be referred to as association request information (which may also be referred to as an association request message in a specific scenario), and the second information may also be referred to as association establishment information (which may also be referred to as an association establishment message in a specific scenario).

Optionally, the second node may further send fifth information to the first node, where the fifth information indicates that association is completed, or includes information used to indicate that association is completed. Correspondingly, the first node may receive the fifth information from the second node, and determine that association is completed. Further, the fifth information may be referred to as association complete information (which may also be referred to as an association complete message in a specific scenario).

Optionally, in a possible design, one or more of the third information, the fourth information, and the fifth information may be encrypted by using an encryption key of a sender, and correspondingly, a receiver performs decryption by using a corresponding decryption key. Further, integrity protection may be performed by using an integrity protection algorithm and an integrity protection key. For example, the fifth information may carry a first message authentication code MAC, and the MAC is obtained by performing integrity protection on data in the fifth information based on an integrity protection algorithm and an integrity protection key Kmac.

Further, optionally, the encryption key, the decryption key, the integrity protection key, and the like may be derived based on the first key, and may be specifically generated by using the KDF and based on the first key Kdh and/or the PSK and one or more of the first freshness parameter NONCEe, the second freshness parameter NONCEa, the ID of the first node, the ID of the second node, a key identifier, and the like. The key identifier may be a character string, a number, or the like that is preconfigured or specified in a protocol. For example, the encryption key Kenc is generated according to the following formula: Kenc=KDF(Kdh∥PSK, NONCEe, NONCEa, IDa, IDe, "EncryptionKey"), where "∥" may indicate concatenation of character strings (this is merely an example, and the character strings may alternatively not be concatenated during specific implementation, for example, are separately used as two input parameters), IDa indicates the ID of the first node, IDe indicates the ID of the second node, and the "EncryptionKey" is an optional key identifier. It should be noted that the "EncryptionKey" is a key identifier of the encryption key. Herein, the "EncryptionKey" is merely used as an example. During specific implementation, another character string, another number, or the like may alternatively be used. This is not limited in this application.

For another example, the integrity protection key Kmac is generated according to the following formula: Kmac=KDF(Kdh∥PSK, NONCEe, NONCEa, IDa, IDe, "MACKey"), or meets the following: Kmac=KDF(Kgt, NONCEe, NONCEa, IDa, IDe, "MACKey"), where the "MACKey" is a key identifier of the integrity key. Herein, the "MACKey" is merely used as an example. During specific implementation, another character string, another number, or the like may alternatively be used. This is not limited in this application.

In a possible design, the encryption key and/or the integrity protection key may be generated based on the first key or a key derived from the first key, and the PSK is not used during derivation. For example, the encryption key Kenc is generated according to the following formula: Kenc=KDF(Kgt, NONCEe, NONCEa, IDa, IDe, "EncryptionKey"), where the key Kgt is a key derived based on the first key Kdh, and the key Kgt meets the following formula: Kgt=KDF(Kdh, NONCEe, NONCEa). For the other parameters, refer to the foregoing descriptions. For another example, the integrity protection key Kmac is generated according to the following formula: Kmac=KDF(Kdh, NONCEe, NONCEa, IDa, IDe, "EncryptionKey"). For the parameters, refer to the foregoing descriptions.

In the embodiment shown in FIG. 3, the second node may protect the ID by using the first public key to obtain the ID ciphertext, so that the real ID is not directly transmitted, and a source and integrity of the first public key may be protected by using the signature of the first public key. Further, the second node may verify the first public key based on the signature of the first public key, and then transmit the ID by "using a public key for encryption and using a private key for decryption". In this way, the first node can obtain the real ID of the second node by decrypting the ID ciphertext. During subsequent communication, a temporary ID may be used to indicate an identity of the second node, to avoid leakage of the real ID of the node and improve data security.

Figure 4:
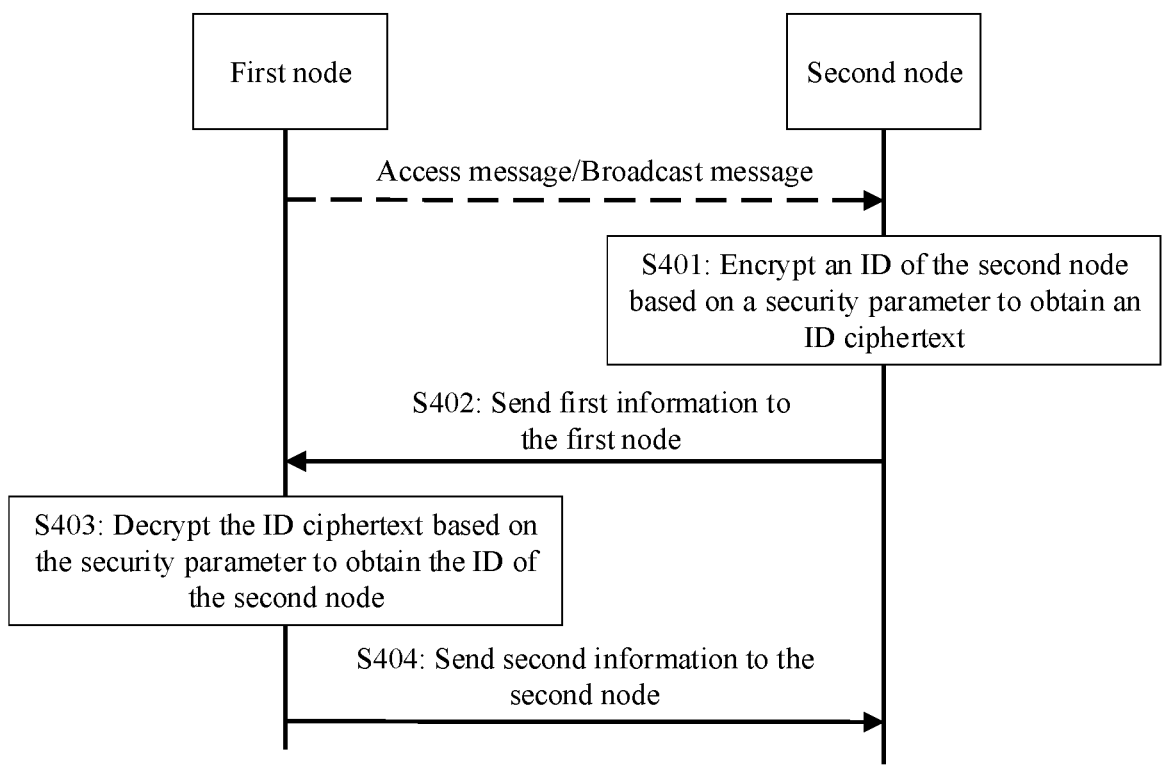
FIG. 4 is a schematic flowchart of another communication method according to an embodiment of the present disclosure.

FIG. 4 is a schematic flowchart of a communication method according to an embodiment of the present disclosure. Further, the method may be implemented based on the architecture shown in FIG. 1. The method includes at least the following steps.

Step S401: A second node encrypts an ID of the second node based on a security parameter to obtain an ID ciphertext.

Specifically, the security parameter is a secrecy value that can be obtained by both a first node and the second node. For example, the security parameter may be a pre-shared key PSK between the first node and the second node, a first password of the first node, or an agreed value allocated by a third-party device to the first node and the second node.

The PSK is a secrecy value preconfigured, predefined, or pre-obtained in the first node and the second node. For example, a CDC of a vehicle and a microphone in a cockpit domain of the vehicle are two nodes that can communicate with each other in the vehicle. A PSK has been preconfigured for the CDC and the microphone in a factory. Therefore, the CDC can verify the microphone of the vehicle by using the PSK. For another example, the PSK may alternatively be obtained by both communication entities in a key obtaining manner. For example, the CDC and a mobile phone terminal may be associated with each other by using a Bluetooth technology. The CDC and the mobile phone terminal may generate a PSK through pairing during first association. Subsequently, the mobile phone only needs to turn on Bluetooth, and the CDC and the mobile phone terminal can authenticate each other's identity and establish association based on the PSK, without re-pairing or the like. In addition, the PSK may alternatively be sent by a device (e.g., one or more of a key distribution center (KDC), a vehicle configuration device, and a vehicle diagnostic device) to the first node and the second node.

In a possible implementation, the PSK corresponds to an identification of the first node and/or an identification of the second node. It may be understood that a node (e.g., the first node or the second node) may store a correspondence between a PSK and the node in one or more of the following formats: a correspondence set, a data table, a database, and the like. Alternatively, the node queries for the correspondence between the PSK and the node from a third-party device (e.g., a server or a network side device). This is not limited in this application. For example, Table 1 is a possible information table of PSKs in the second node according to an embodiment of the present disclosure. The information table includes identifications of a plurality of nodes, corresponding PSKs, IDs of the PSKs (referred to as PSK IDs in this embodiment of the present disclosure), and types of the PSKs (this is merely an example herein, and during specific implementation, some of the information may alternatively not be included, or other information such as one or more of configuration time and validity duration may be further included). It can be learned from Table 1 that a PSK shared by the second node and a node with an identification of "IDa1" is a "PSK1", a PSK ID is "PId1", and a type of the PSK is "Preconfigured"; and a PSK shared by the second node and a node with an identification of "IDa2" is a "PSK2", a PSK ID is "PId2", and a type of the PSK is "Generated".

TABLE 1

Information table of PSKs in the second node

| Identification | PSK | PSK ID | Type of obtaining |
|---|---|---|---|
| IDa1 | PSK1 | PId1 | Preconfigured |
| IDa2 | PSK2 | PId2 | Generated |
| IDa3 | PSK3 | PId3 | Generated |

The first password may be considered as an access password, and may be specifically a password preconfigured or predefined in the first node to enable the second node to access the first node, or a secrecy value agreed upon between the first node and the second node. For example, in a scenario in which a mobile phone accesses a router that supports the Wi-Fi protocol, the mobile phone terminal may access the router by using a "Wi-Fi password", and the "Wi-Fi password" may be understood as a first password of the router. For another example, the access password of the first node is a password, the second node may generate access information by using the password, and the second node generates verification information by using the same password in a same generation manner. If the verification information is the same as the access information, it indicates that an access password used by the second node is correct, and therefore the second node is allowed to access the first node.

Optionally, the first password may alternatively be input by a user and received by the second node, or may be sent by another node (e.g., at least one of a server and a KDC) to the second node and received by the second node, or may be preconfigured in the second node (e.g., a corresponding password is configured during factory setting).

The ID of the second node is a permanent ID (also referred to as a real ID, a fixed ID, or the like) of the second node. For example, an IMEI of a mobile phone terminal may be understood as a permanent ID of the mobile phone terminal. An identity of a node may be identified by a permanent ID.

The second node may encrypt the ID of the second node based on the security parameter to obtain the ID ciphertext in at least the following several possible implementations.

Implementation 1: The second node encrypts the ID of the second node based on the security parameter by using an encryption algorithm, to obtain the ID ciphertext. Specifically, for example, the security parameter is the PSK, and the second node generates the ID ciphertext IDc based on the PSK by using the encryption algorithm Enc. For example, IDc=Enc(PSK, IDe), where Enc may be one or more of the following algorithms: AES, DES, 3DES, AES-CCM, AES-GCM, and the like. For another example, the security parameter is the first password PW, and the second node generates the ID ciphertext IDc based on the first password PW by using the encryption algorithm Enc. For example, IDc=Enc(PW, IDe).

Implementation 2: The second node determines a first protection key based on the security parameter, and encrypts the ID of the second node based on the first protection key to obtain the ID ciphertext.

The first protection key is determined based on the security parameter. For example, the first node performs an exclusive OR operation on the security parameter and a secrecy value Kor to obtain the first protection key. The secrecy value Kor may be a predefined or preconfigured secrecy value, or may be a secrecy value obtained through agreement between the first node and the second node. Specifically, for example, the security parameter is the PSK between the first node and the second node, and a predefined or preconfigured secrecy value is Kor. The first protection key K1 meets the following formula: K1=PSK⊕Kor, where ⊕ indicates an exclusive OR operation. It should be noted that the secrecy value Kor is described as a secrecy value Kor herein to indicate that an exclusive OR operation can be performed on the secrecy value Kor and the security parameter, and during specific implementation, the secrecy value may have another name (e.g., a session key) or may not be named.

Further, optionally, the second node may generate a first protection key based on the security parameter and a hash algorithm, and encrypt the ID of the second node by using the first protection key. The first protection key may also be understood as a hash value of the security parameter. For example, the first protection key K1 meets the following: K1=hash(PSK); or meets the following: K1=hash(PW). For example, the ID ciphertext IDc is generated according to the following formula: IDc=Enc(K1, IDe).

Alternatively, the second node may generate a first protection key based on the security parameter and a KDF. Further, optionally, another parameter like a freshness parameter may be further used to generate the first protection key. For example, the security parameter is the PSK, and the second node may generate the first protection key K1 based on the PSK, fresh, and the KDF. For example, K1=KDF(PSK, fresh), where fresh1 may be a freshness parameter (referred to as a first freshness parameter for ease of description) determined by the second node, for example, may be a nonce NONCEe. For another example, the security parameter is the first password PW, and the second node may generate the first protection key K1 based on the first password PW. For example, K1=KDF(PW, fresh). The first node encrypts the ID of the first node by using the first protection key K1, to obtain the ID ciphertext IDc. For example, IDc=Enc(K1, IDe), where Enc may be one or more of the following algorithms: AES, DES, 3DES, AES-CCM, AES-GCM, and the like.

It should be noted that how to obtain the first protection key is explained by using two steps herein to more clearly describe the solution. During actual processing, the first protection key may alternatively be obtained in one step. The first protection key K1 is merely an intermediate result. For example, the ID ciphertext IDc is determined according to the following formula: IDc=Enc(KDF(PSK, fresh), IDe); or meets the following: IDc=Enc(KDF(PW, fresh), IDe).

Step S402: The second node sends first information to the first node.

Specifically, the first information includes the ID ciphertext. The second node sends the first information to the first node, and correspondingly, the first node receives the first information from the second node, to obtain content in the first information.

Optionally, the first information may further include a first key agreement parameter, and the first key agreement parameter may be generated based on a key agreement algorithm, or may be obtained according to a preconfigured or predefined calculation method.

Further, optionally, the first information further includes a first freshness parameter. For example, the first freshness parameter may be a nonce NONCEe determined by the second node.

Optionally, the first information further includes first indication information, and the first indication information indicates that the association request information includes the ID ciphertext. Optionally, the first indication information may be a first field included in the first information. For example, a value "0" of the first field indicates that the first information includes the ID ciphertext. In this way, the first node can determine, by parsing the first information, whether to perform a step of decrypting the ID ciphertext. Further, a value "1" of the first field indicates that the first information includes the temporary ID. For another example, the first information may include an ID type, and the ID type may be one or more of an ID ciphertext, a temporary ID, and the like.

Optionally, the first information further includes a PSK ID, and the PSK ID is an ID corresponding to a PSK shared by the first node and the second node. Further, when the ID ciphertext is obtained through encryption based on the PSK, the first node may determine, based on the PSK ID in the first information, the PSK shared with the second node, and then decrypt the ID ciphertext by using the PSK to obtain the ID of the second node.

Optionally, the first information further includes an ID corresponding to the first password. In a possible design, different passwords correspond to different password IDs, and the first password used for decrypting the first ciphertext may be determined based on the ID corresponding to the first password. Further, different passwords may correspond to different permission control. Therefore, the first node may determine the first password based on the ID corresponding to the first password, and further determine permission information corresponding to the second node, and the like.

Optionally, during specific implementation, the first information may also be referred to as association request information (which may also be referred to as an association request message in a specific scenario).

Step S403: The first node decrypts the ID ciphertext based on the security parameter to obtain the ID of the second node.

Specifically, because the ID ciphertext corresponds to the security parameter and the ID of the second node, the first node may determine the ID of the second node based on the security parameter and the ID ciphertext.

In an implementation, according to a stipulation in a protocol, the first node decrypts the ID key to obtain the ID of the second node in a manner corresponding to a manner of encrypting, by the second node, the ID of the second node to obtain the ID ciphertext. Specifically, the first node may decrypt the ID ciphertext based on the security parameter to obtain the ID of the second node in at least the following several possible implementations.

Implementation 1: The first node decrypts the ID ciphertext based on the security parameter by using a decryption algorithm (a specific algorithm may be the same as the encryption algorithm), to obtain the ID of the second node. Specifically, for example, the security parameter is the PSK, and the first node obtains the ID of the second node based on the PSK by using the decryption algorithm Dec and the ciphertext IDc. For example, IDe=Dec(PSK, IDc), where Dec may be one or more of the following algorithms: AES, DES, 3DES, AES-CCM, AES-GCM, and the like. For another example, the security parameter is the first password PW of the first node, and the first node obtains the ID of the second node based on the first password PW by using the decryption algorithm Dec and the ciphertext IDc. For example, IDe=Dec(PW, IDc).

Implementation 2: The first node determines the first protection key based on the security parameter, and decrypts the ID ciphertext based on the first protection key to obtain the ID of the second node.

Further, optionally, the first node may generate a first protection key based on the security parameter and a hash algorithm, and decrypt the ID ciphertext by using the first protection key. The first protection key may also be understood as a hash value of the security parameter. For example, the first protection key K1 meets the following: K1=hash(PSK); or meets the following: K1=hash(PW). For example, the ID ciphertext IDc is decrypted to obtain the ID of the second node according to the following formula: IDe=Dec(K1, IDc).

Alternatively, the second node may generate a first protection key based on the security parameter and a KDF. Further, optionally, another parameter like a freshness parameter may be further used to generate the first protection key. For example, the security parameter is the PSK, and the first node may generate the first protection key K1 based on the PSK, fresh, and the KDF. For example, K1=KDF(PSK, fresh), where fresh1 may be the first freshness parameter NONCEe in the first information. For another example, the security parameter is the first password PW, and the first node may generate the first protection key K1 based on the first password PW. For example, K1=KDF(PW, fresh). The first node decrypts the ID ciphertext by using the first protection key K1, to obtain the ID of the first node. For example, IDe=Dec(K1, IDc), where Dec may be one or more of the following algorithms: AES, DES, 3DES, AES-CCM, AES-GCM, and the like.

It should be noted that how to obtain the first protection key is explained by using two steps herein to more clearly describe the solution. During actual processing, the first protection key may alternatively be obtained in one step. The first protection key K1 is merely an intermediate result. That is, the ID ciphertext IDc is determined according to the following formula: IDe=Dec(KDF(PSK, fresh), IDc); or meets the following: IDe=Dec(KDF(PW, fresh), IDc).

Step S404: The first node sends second information to the second node.

Specifically, the second information includes a temporary ID allocated to the second node. The temporary ID is used to temporarily indicate an identity of the second node. For example, information subsequently sent by the second node to the first node may carry the temporary ID, and the first node may determine, based on the temporary ID, that the information comes from the second node.

For a specific implementation, refer to specific descriptions in step S306.

In the embodiment shown in FIG. 4, the PSK shared with the first node is predefined, preconfigured, or pre-generated in the second node. Therefore, the real ID may be encrypted by using the PSK. Correspondingly, the ID ciphertext may be decrypted based on the PSK to obtain the real ID of the second node, so as to determine an identity of the second node. During subsequent communication, a temporary ID may be used to indicate an identity of the second node, to avoid leakage of the real ID of the node and improve data security.

Alternatively, the second node may encrypt the ID of the second node based on the first password, so that the first node can decrypt the ID ciphertext based on the first password to obtain the ID of the second node. A node that obtains the first password is usually trusted, and therefore communication security can be ensured. During subsequent communication, a temporary ID may be used to indicate an identity of the second node, to avoid leakage of the real ID of the node and improve data security.

The method embodiments shown in FIG. 3 and FIG. 4 include many possible implementation solutions. The following describes some of the implementation solutions with reference to FIG. 5A and FIG. 5B, FIG. 6A and FIG. 6B, or FIG. 7A and FIG. 7B. It should be noted that, for related concepts, operations, or logical relationships that are not explained in FIG. 5A and FIG. 5B, FIG. 6A and FIG. 6B, or FIG. 7A and FIG. 7B, reference may be made to corresponding descriptions in the embodiments shown in FIG. 3 and FIG. 4.

Figure 5A:
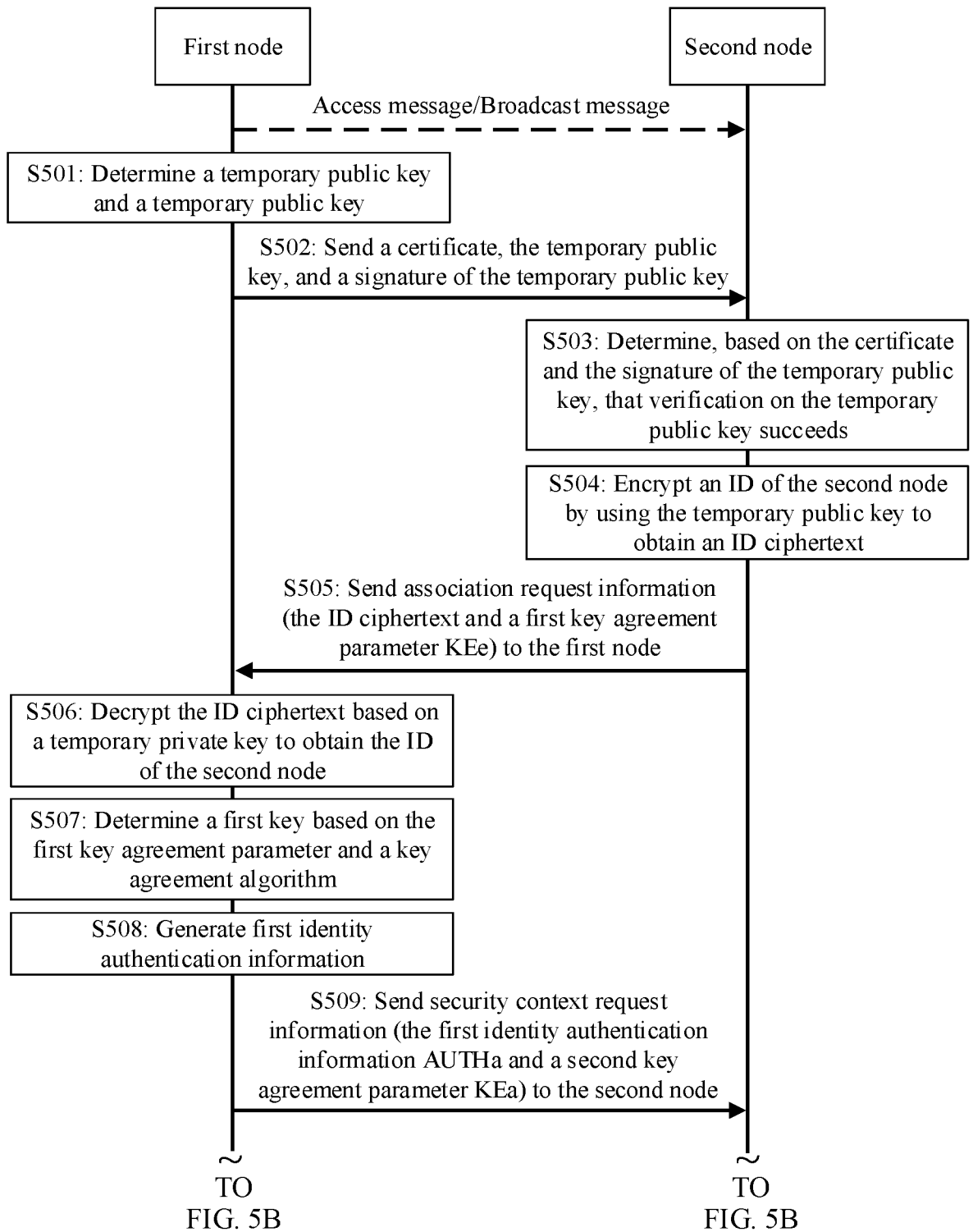
FIG. 5A and FIG. 5B are a schematic flowchart of still another communication method according to an embodiment of the present disclosure.
Figure 5B:
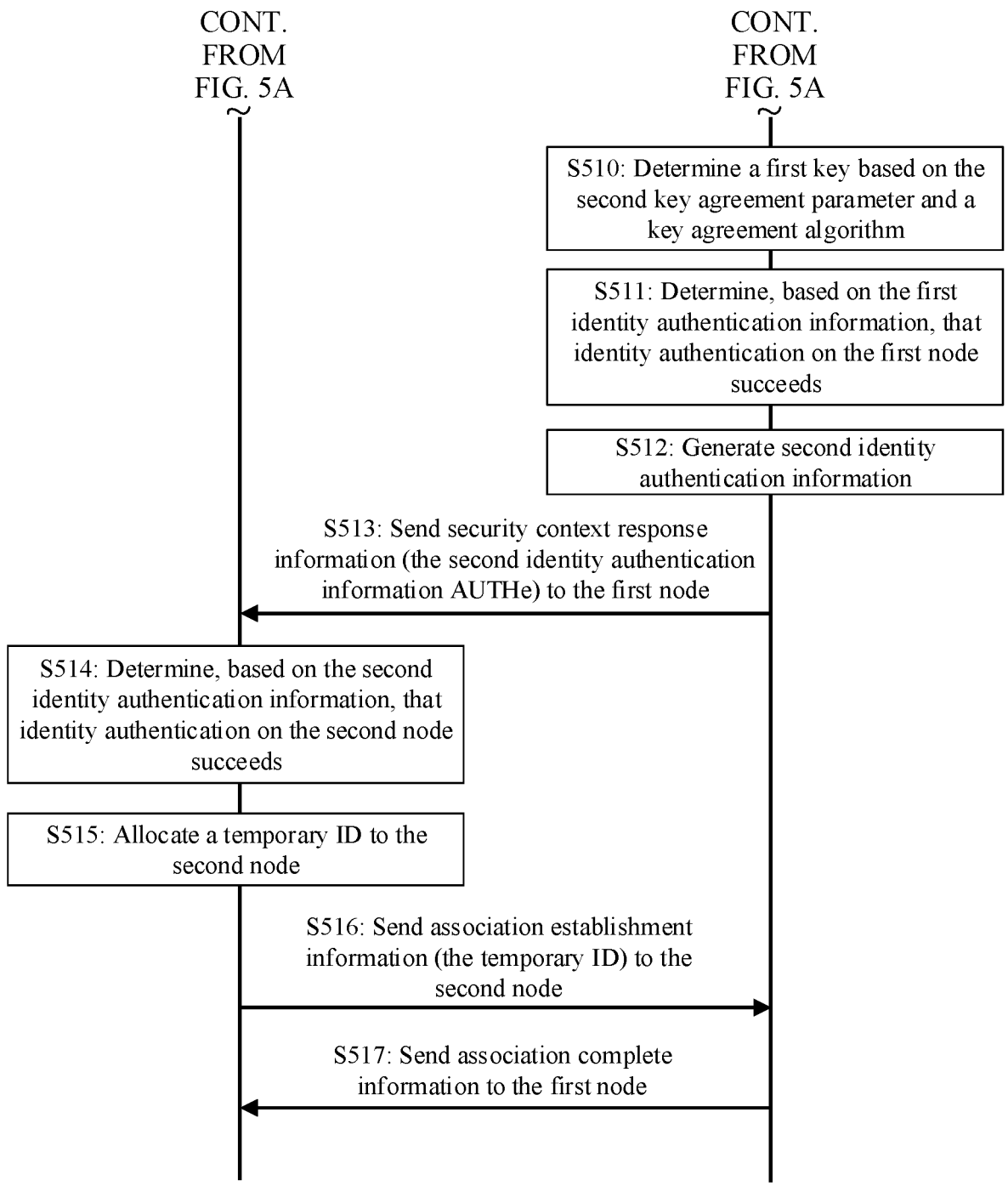

FIG. 5A and FIG. 5B are a schematic diagram of another possible communication method according to an embodiment of the present disclosure. The method includes at least the following steps.

Optionally, the communication method may include step S501. Details are as follows.

Step S501: A first node determines a temporary public key and a temporary public key. Optionally, this may be understood as follows: In an actual implementation scenario, the temporary public key and the temporary private key may be determined by the first node, or may not be determined by the first node (e.g., may be determined by another node and then sent to the first node). This may specifically depend on an implementation of the first node, a pre-agreement, or a definition in a standard.

Specifically, the first node may periodically or aperiodically generate a temporary key pair (including a temporary public key and a temporary private key). For example, the first node may broadcast a temporary key pair every 10 minutes. For another example, the first node may send access information to a second node in a unicast or multicast mode, and after receiving a response from the second node to the access information, determine that the temporary key pair is to be used for communication encryption.

Step S502: The first node sends a certificate, the temporary public key, and a signature of the temporary public key.

Specifically, the first node may send the certificate, the temporary public key, and the signature of the temporary public key to the second node in a unicast mode, or may send the certificate, the temporary public key, and the signature of the temporary public key in a broadcast or multicast mode. Correspondingly, the second node receives the certificate, the temporary public key, and the signature of the temporary public key from the first node.

Optionally, the certificate, the temporary public key, and the signature of the temporary public key may be included in one piece of information, or may be separately sent to the second node by using different information. Herein, one sending action is described for ease of description. During specific implementation, the first node may send one or more pieces of information, to send the certificate, the temporary public key, and the signature of the temporary public key to the second node.

For a specific implementation, refer to detailed descriptions in step S301.

Step S503: The second node determines, based on the certificate and the signature of the temporary public key, that verification on the temporary public key succeeds.

For a specific implementation, refer to detailed descriptions in step S302.

Step S504: The second node encrypts an ID of the second node by using the temporary public key to obtain an ID ciphertext.

For a specific implementation, refer to detailed descriptions in step S303.

Step S505: The second node sends association request information to the first node.

Specifically, the association request information includes the ID ciphertext. The second node sends the association request information to the first node, and correspondingly, the first node receives the association request information from the second node.

Optionally, the association request information may further include a first key agreement parameter KEe, and the first key agreement parameter may be generated based on a key agreement algorithm, or may be obtained according to a preconfigured or predefined calculation method. For example, a DH algorithm is used as an example. Two primes with large values are pre-obtained between the first node and the second node: a prime p and a prime g. Based on the DH algorithm, the second node generates a nonce a, and calculates the first key agreement parameter: KEe=ga mod p, where mod indicates a modulo operation. The first key agreement parameter KEe is sent to the first node for generating a first key. It should be noted that the DH algorithm is merely used as an example in this embodiment of the present disclosure. During specific implementation, another key agreement algorithm may alternatively be included, and correspondingly, a key agreement parameter of a specifically used key agreement algorithm is also generated. Examples are not described herein one by one.

Optionally, the association request information further includes a first freshness parameter NONCEe.

Optionally, when a first public key corresponds to an identifier of a key pair, the first information further includes the identifier of the key pair corresponding to the first public key, so that the first node determines, based on the identifier of the key pair, a first private key used to decrypt the ciphertext.

Optionally, the first information further includes first indication information, and the first indication information indicates that the association request information includes the ID ciphertext. Optionally, the first indication information may be a first field included in the first information. For example, a value "0" of the first field indicates that the first information includes the ID ciphertext. In this way, the first node can determine, by parsing the first information, whether to perform a step of decrypting the ID ciphertext. Further, a value "1" of the first field indicates that the first information includes the temporary ID. For another example, the first information may include an ID type, and the ID type may be one or more of an ID ciphertext, a temporary ID, and the like.

Optionally, the first information further includes a PSK ID, and the PSK ID is an ID corresponding to a PSK shared by the first node and the second node. Further, the PSK ID may be used by the first node to determine the PSK shared by the first node and the second node.

Step S506: The first node decrypts the ID ciphertext based on the temporary private key to obtain the ID of the second node.

For a specific implementation, refer to detailed descriptions in step S305.

Optionally, the communication method may include step S505 to step S515. Details are as follows.

Step S507: The first node determines a first key based on the first key agreement parameter and a key agreement algorithm.

Specifically, the first node may determine, by using the key agreement algorithm, a private key used by the first node during key agreement, so as to determine the first key based on the KEe and the private key used by the first node during key agreement.

For example, the DH algorithm is used as an example. Because $KEe=g^a \bmod p$, the first node may determine a nonce b based on the key agreement algorithm, and the first key Kdh meets the following formula: $Kdh=KEe^b \bmod p$.

Further, the first key may be used for subsequent communication encryption, or used to derive a key used for communication encryption (e.g., derive one or more of an encryption key, an integrity protection key, and the like).

Step S508: The first node generates first identity authentication information.

Specifically, the first node generates the first identity authentication information in at least the following several implementations.

Implementation 1: When a PSK between the first node and the second node exists in the first node, the first node generates the first identity authentication information AUTHa based on the PSK and one or more of the association request information, some parameters (e.g., the first freshness parameter NONCEe) in the association request information, a second freshness parameter NONCEa, or security context request information including the first identity authentication information (or specifically, some parameters in the security context request information). The second freshness parameter is one of a nonce, a counter, a serial number, and the like that are determined by the first node.

For example, the first identity authentication information AUTHa meets the following formula: AUTHa=KDF(PSK, the association request information, the security context request information).

For another example, the first identity authentication information AUTHa meets the following formula: AUTHa=KDF(PSK, NONCEe, NONCEa).

Implementation 2: When a PSK between the first node and the second node exists in the first node, the first node generates a second key based on the PSK, and obtains the first identity authentication information by using the second key.

Optionally, the first node generates the second key based on the PSK and other information, where the other information includes one or more of the first freshness parameter NONCEe, a second freshness parameter NONCEa, an ID of the first node, the ID of the second node, and a key identifier. The key identifier is a predefined or preconfigured identifier used to indicate a type of a key to be generated, and may be a character string, a number, or the like. For example, the second key Kauth meets the following formula: Kauth=KDF (PSK, NONCEe, NONCEa, IDa, IDe, "authentication"), where IDa indicates the ID of the first node, IDe indicates the ID of the second node, and the "authentication" is an optional key identifier.

The first node generates the first identity authentication information AUTHa based on the second key and one or more of the association request information, some parameters (e.g., the first freshness parameter NONCEe) in the association request information, the second freshness parameter NONCEa, or security context request information including the first identity authentication information (or specifically, some parameters in the security context request information).

For example, the first identity authentication information AUTHa meets the following formula: AUTHa=KDF(Kauth, the association request information, the security context request information).

For another example, the first identity authentication information AUTHa meets the following formula: AUTHa=KDF(Kauth, NONCEe, NONCEa).

Implementation 3: When a PSK between the first node and the second node exists in the first node, the first node generates a second key based on the first key and the PSK, and obtains the first identity authentication information by using the second key.

Optionally, the first node generates the second key based on the first key Kdh, the PSK, and other information, where the other information includes one or more of the first freshness parameter NONCEe, a second freshness parameter NONCEa, an ID of the first node, the ID of the second node, and a key identifier. The key identifier is a predefined or preconfigured identifier used to indicate a type of a key to be generated, and may be a character string, a number, or the like. For example, the second key Kauth meets the following formula: Kauth=KDF(Kdh|PSK, NONCEe, NONCEa, IDa, IDe, "authentication"), where "|" may indicate concatenation of character strings (this is merely an example, and the character strings may alternatively not be concatenated during specific implementation, for example, are separately used as two input parameters), IDa indicates the ID of the first node, IDe indicates the ID of the second node, and the "authentication" is an optional key identifier.

The first node generates the first identity authentication information AUTHa based on the second key and one or more of the association request information, some parameters (e.g., the first freshness parameter NONCEe) in the association request information, the second freshness parameter NONCEa, or security context request information including the first identity authentication information (or specifically, some parameters in the security context request information).

For example, the first identity authentication information AUTHa meets the following formula: AUTHa=KDF(Kauth, the association request information, the security context request information).

For another example, the first identity authentication information AUTHa meets the following formula: AUTHa=KDF(Kauth, NONCEe, NONCEa).

It should be noted that how to obtain the second key Kauth is explained by using two steps herein to more clearly describe the solution. During actual processing, the second key Kauth may alternatively be obtained in one step. The second key Kauth is merely an intermediate result.

Alternatively, the first key Kdh may be replaced with a key Kgt derived based on the first key Kdh. For example, Kgt=KDF(Kdh, NONCEe, NONCEa), or Kgt=KDF(Kdh, fresh), where fresh indicates a freshness parameter, so that Kgt derived based on Kdh each time varies. For details, refer to related descriptions in the embodiment shown in FIG. 3.

Step S509: The first node sends the security context request information to the second node.

Specifically, the security context request information includes second identity authentication information, a second key agreement parameter KEa, and the second freshness parameter. Optionally, the first identity authentication information may be further included.

Optionally, the association request information may further include a first key agreement parameter KEe, and the first key agreement parameter may be generated based on a key agreement algorithm, or may be obtained according to a preconfigured or predefined calculation method. For example, a DH algorithm is used as an example. Two primes with large values are pre-obtained between the first node and the second node: a prime p and a prime g. Based on the DH algorithm, the second node generates a nonce a, and calculates the first key agreement parameter: KEe=ga mod p, where mod indicates a modulo operation. The first key agreement parameter KEe is sent to the first node for generating a first key. It should be noted that the DH algorithm is merely used as an example in this embodiment of the present disclosure. During specific implementation, another key agreement algorithm may alternatively be included, and correspondingly, a key agreement parameter of a specifically used key agreement algorithm is also generated. Examples are not described herein one by one.

The second key agreement parameter may be generated based on a key agreement algorithm, or may be obtained according to a preconfigured or predefined calculation method. For example, the DH algorithm is used as an example. Two primes with large values are pre-obtained between the first node and the second node: a prime p and a prime g. Based on the DH algorithm, the first node generates a nonce b, and calculates the second key agreement parameter: KEa=gb mod p, where mod indicates a modulo operation. The second key agreement parameter KEa is sent to the second node for generating a first key. It should be noted that the DH algorithm is merely used as an example in this embodiment of the present disclosure. During specific implementation, another key agreement algorithm may alternatively be included, and correspondingly, a key agreement parameter of a specifically used key agreement algorithm is also generated. Examples are not described herein one by one.

Step S510: The second node determines a first key based on the second key agreement parameter and a key agreement algorithm.

Specifically, the second node may determine, by using the key agreement algorithm, a private key used by the second node during key agreement, so as to determine the first key based on the KEe and the private key used by the first node during key agreement.

For example, the DH algorithm is used as an example. Because KEa=gb mod p, the first key Kdh meets the following formula: Kdh=KEaa mod p. Because KEeb mod p=(ga mod p)b mod p=gab mod p=(gb mod p)a mod p=KEaa mod p, the Kdh determined by the first node is the same as the Kdh determined by the second node.

Step S511: The second node determines, based on the first identity authentication information, that identity authentication on the first node succeeds.

In an optional solution, according to a stipulation in a protocol, a parameter used by the second node to generate check information should be the same as a parameter used by the first node to generate the first identity authentication information. If the check information is the same as the first identity authentication information, it is considered that verification succeeds. For example, the first identity authentication information is generated by using a KDF. Therefore, the second node may generate check information by using a KDF, where the check information is also referred to as a check value check2, and then verify, by using the check information, whether the first identity authentication information is correct. An example is used below for description.

For example, if the first identity authentication information meets the following: AUTHa=KDF(Kauth, the association request information, the security context request information), the second node determines Kauth based on the first key and/or the PSK, and generates the check value check2 based on the following formula: check2=KDF(Kauth, the association request information, the security context request information). If the check value check2 is the same as AUTHa, it is determined that identity authentication on the first node succeeds.

Optionally, if the verification based on the first identity authentication information fails, the second node may interrupt a communication connection between the second node and the first node.

Step S512: The second node generates second identity authentication information.

Specifically, for an implementation of generating the second identity authentication information by the second node, refer to related descriptions on the first node side in step S508.

For example, when a PSK corresponding to the first node exists in the second node, second identity authentication information AUTHe generated by the second node based on the PSK may meet the following formula: AUTHe=KDF (PSK, the security context request information, security context response information).

For another example, when a PSK corresponding to the first node exists in the second node, the second node determines a second key Kauth based on the first key Kdh and/or the PSK, and second identity authentication information AUTHe generated by using the second Kauth may meet the following formula: AUTHe=KDF(Kauth, the security context request information, security context response information).

Step S513: The second node sends the security context response information to the first node.

Optionally, the security context request information includes the second identity authentication information.

Step S514: The first node determines, based on the second identity authentication information, that identity authentication on the second node succeeds.

In an optional solution, according to a stipulation in a protocol, a parameter used by the first node to generate check information should be the same as a parameter used by the second node to generate the second identity authentication information. If the check information is the same as the second identity authentication information, it is considered that verification succeeds. For example, the second identity authentication information is generated by using a KDF. Therefore, the second node may generate check information by using a KDF, where the check information is also referred to as a check value check1, and then verify, by using the check information, whether the first identity authentication information is correct. An example is used below for description.

For example, if the second identity authentication information meets the following: AUTHe=KDF(Kauth, the security context request information, the security context response information), the first node determines Kauth based on the first key and/or the PSK, and generates the check value check1 based on the following formula: check1=KDF(Kauth, the security context request information, the security context response information). If the check value check1 is the same as AUTHe, it is determined that identity authentication on the second node succeeds.

Optionally, if the verification based on the second identity authentication information fails, the first node may interrupt a communication connection between the first node and the second node.

Step S515: The first node allocates a temporary ID to the second node.

Specifically, the temporary ID is used to temporarily indicate an identity of the second node. Further, a correspondence between the ID (a permanent ID) and the temporary ID may be further stored.

The temporary ID may be allocated by using a fixed algorithm, or may be randomly allocated. For example, a length and/or a format (e.g., including one or more of a digit, an uppercase letter, a lowercase letter, and the like) of a temporary ID are/is predefined or preset by the first node or specified in a protocol, and the first node randomly allocates a temporary ID to the second node based on the length and/or the format.

Optionally, the first node determines that an identity of the second node is trusted, and allocates a temporary ID to the second node. For example, that the identity of the second node is trusted may be determined in the manner described in step S507 to step S514.

Step S516: The first node sends association establishment information to the second node.

For a specific implementation, refer to related descriptions in step S305.

Optionally, the communication method may include step S517. Details are as follows.

Step S517: The second node sends association complete information to the first node.

Specifically, the association complete information indicates that association is completed, or includes information used to indicate that association is completed.

In the embodiment shown in FIG. 5A and FIG. 5B, the second node may protect the ID by using the temporary public key to obtain the ID ciphertext, so that the real ID is not directly transmitted, and a source and integrity of the temporary public key may be protected by using the signature of the temporary public key. Further, the second node may verify the temporary public key based on the signature of the temporary public key, and then transmit the ID by "using a public key for encryption and using a private key for decryption". In this way, the first node can obtain the real ID of the second node by decrypting the ID ciphertext. During subsequent communication, a temporary ID may be used to indicate an identity of the second node, to avoid leakage of the real ID of the node and improve data security.

Figure 6A:
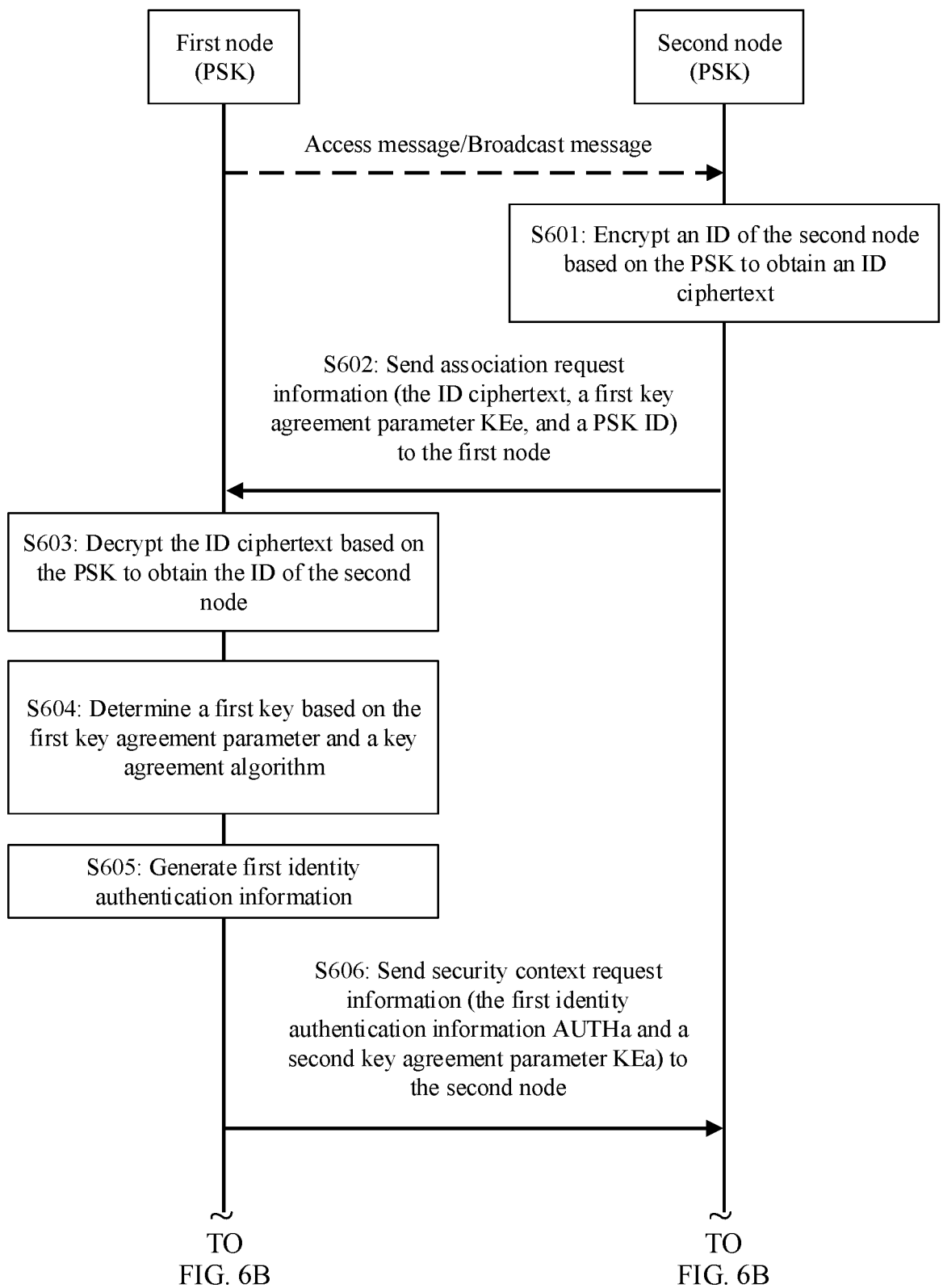
FIG. 6A and FIG. 6B are a schematic flowchart of still another communication method according to an embodiment of the present disclosure.
Figure 6B:
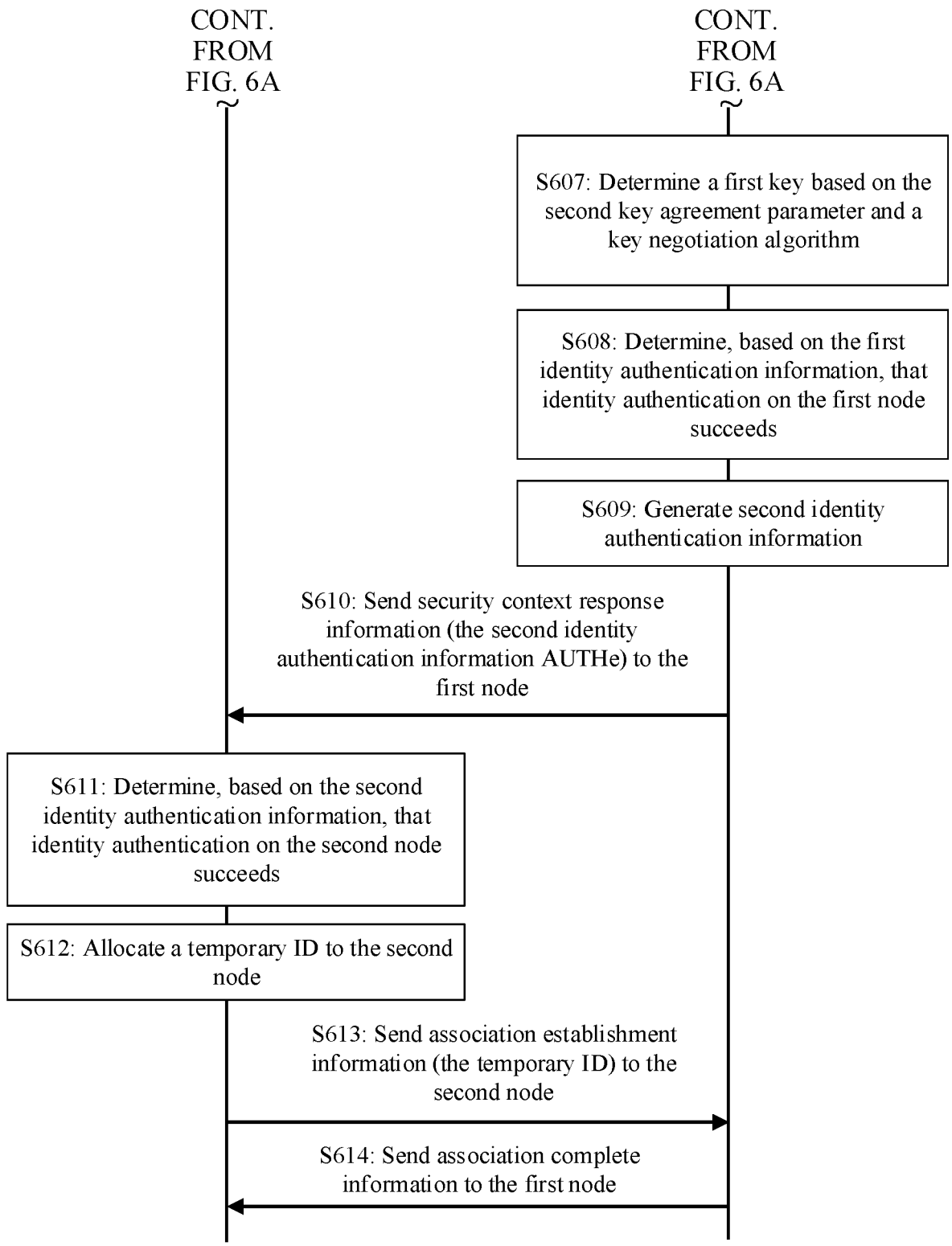

FIG. 6A and FIG. 6B are a schematic diagram of another possible communication method according to an embodiment of the present disclosure. The method includes at least the following steps.

Step S601: A second node encrypts an ID of the second node based on a PSK to obtain an ID ciphertext.

Specifically, the second node may encrypt the ID of the second node based on the PSK to obtain the ID ciphertext in at least the following several possible implementations.

Implementation 1: The second node encrypts the ID of the second node based on the PSK by using an encryption algorithm, to obtain the ID ciphertext. Specifically, the second node generates the ID ciphertext IDc based on the PSK by using the encryption algorithm Enc. For example, IDc=Enc(PSK, IDe), where Enc may be one or more of the following algorithms: AES, DES, 3DES, AES-CCM, AES-GCM, and the like.

Implementation 2: The second node generates a first protection key based on the PSK, and encrypts the ID of the second node based on the first protection key to obtain the ID ciphertext.

Further, optionally, the second node may generate a first protection key by using the PSK and a hash algorithm, and encrypt the ID of the second node by using the first protection key. The first protection key may also be understood as a hash value of the PSK. For example, the first protection key K1 meets the following: K1=hash(PSK). Further, the ID ciphertext IDc is generated according to the following formula: IDc=Enc(K1, IDe).

Alternatively, the second node may generate a first protection key based on the PSK and a KDF. Further, optionally, another parameter like a freshness parameter may be further used to generate the first protection key. For example: K1=KDF(PSK, fresh).

It should be noted that how to obtain the first protection key is explained by using two steps herein to more clearly describe the solution. During actual processing, the first protection key may alternatively be obtained in one step. The first protection key K1 is merely an intermediate result. For example, the ID ciphertext IDc is determined according to the following formula: IDc=Enc(KDF(PSK, fresh), IDe).

Step S602: The second node sends association request information to a first node.

Specifically, the association request information includes the ID ciphertext. The second node sends the association request information to the first node, and correspondingly, the first node receives the association request information from the second node, to obtain content in the association request information.

Optionally, the association request information may further include a first key agreement parameter, and the first key agreement parameter may be generated based on a key agreement algorithm, or may be obtained according to a preconfigured or predefined calculation method.

Further, optionally, the association request information further includes a first freshness parameter. For example, the first freshness parameter may be a nonce NONCEe determined by the second node.

Optionally, the association request information further includes first indication information, and the first indication information indicates that the association request information includes the ID ciphertext. Optionally, the first indication information may be a first field included in the first information. For example, a value "0" of the first field indicates that the first information includes the ID ciphertext. In this way, the first node can determine, by parsing the first information, whether to perform a step of decrypting the ID ciphertext. Further, a value "1" of the first field indicates that the first information includes the temporary ID. For another example, the first information may include an ID type, and the ID type may be one or more of an ID ciphertext, a temporary ID, and the like.

Optionally, the association request information further includes a PSK ID, and the PSK ID is an ID corresponding to a PSK shared by the first node and the second node. Further, when the ID ciphertext is obtained through encryption based on the PSK, the first node may determine, based on the PSK ID in the association request information, the PSK shared with the second node, and then decrypt the ID ciphertext by using the PSK to obtain the ID of the second node.

Step S603: The first node decrypts the ID ciphertext based on the PSK to obtain the ID of the second node.

Specifically, because the ID ciphertext corresponds to the PSK and the ID of the second node, the first node may determine the ID of the second node based on the PSK and the ID ciphertext.

In an implementation, according to a stipulation in a protocol, the first node decrypts the ID key to obtain the ID of the second node in a manner corresponding to a manner of encrypting, by the second node, the ID of the second node to obtain the ID ciphertext. Specifically, the first node may decrypt the ID ciphertext based on the PSK to obtain the ID of the second node in at least the following several possible implementations.

Implementation 1: The first node decrypts the ID ciphertext based on the PSK by using a decryption algorithm (a specific algorithm may be the same as the encryption algorithm), to obtain the ID of the second node. For example, IDe=Dec(PSK, IDc), where Dec may be one or more of the following algorithms: AES, DES, 3DES, AES-CCM, AES-GCM, and the like.

Implementation 2: The first node determines the first protection key based on the PSK, and decrypts the ID ciphertext based on the first protection key to obtain the ID of the second node.

Further, optionally, the first node may generate a first protection key based on the PSK and a hash algorithm, and decrypt the ID ciphertext by using the first protection key. The first protection key may also be understood as a hash value of the PSK. For example, the first protection key K1 meets the following: K1=hash(PSK). For example, the ID ciphertext IDc is decrypted to obtain the ID of the second node according to the following formula: IDe=Dec(K1, IDc). For a specific implementation, refer to specific descriptions in step S403.

Optionally, the communication method may include step S604 to step S613. For specific implementations of step S604 to step S613, refer to descriptions of corresponding steps in step S505 to step S515. Step S604 to step S613 are specifically as follows.

Step S604: The first node determines a first key based on the first key agreement parameter and a key agreement algorithm.

Step S605: The first node generates first identity authentication information based on the first key.

Step S606: The first node sends security context request information to the second node.

Step S607: The second node determines a first key based on a second key agreement parameter and a key agreement algorithm.

Step S608: The second node determines, based on the first identity authentication information, that identity authentication on the first node succeeds.

Step S609: The second node generates second identity authentication information.

Step S610: The second node sends security context response information to the first node.

Step S611: The first node determines, based on the second identity authentication information, that identity authentication on the second node succeeds.

Step S612: The first node allocates a temporary ID to the second node.

Step S613: The first node sends association establishment information to the second node.

For a specific implementation, refer to related descriptions in step S404.

Step S614: The second node sends association complete information to the first node.

Specifically, the association complete information indicates that association is completed, or includes information used to indicate that association is completed. The second node sends the association complete information to the first node, and correspondingly, the first node receives the association complete information from the second node.

In the embodiment shown in FIG. 6A and FIG. 6B, the PSK shared with the first node is predefined, preconfigured, or pre-generated in the second node. Therefore, the real ID may be encrypted by using the PSK. Correspondingly, the ID ciphertext may be decrypted based on the PSK to obtain the real ID of the second node, so as to determine an identity of the second node. During subsequent communication, a temporary ID may be used to indicate an identity of the second node, to avoid leakage of the real ID of the node and improve data security.

Figure 7A:
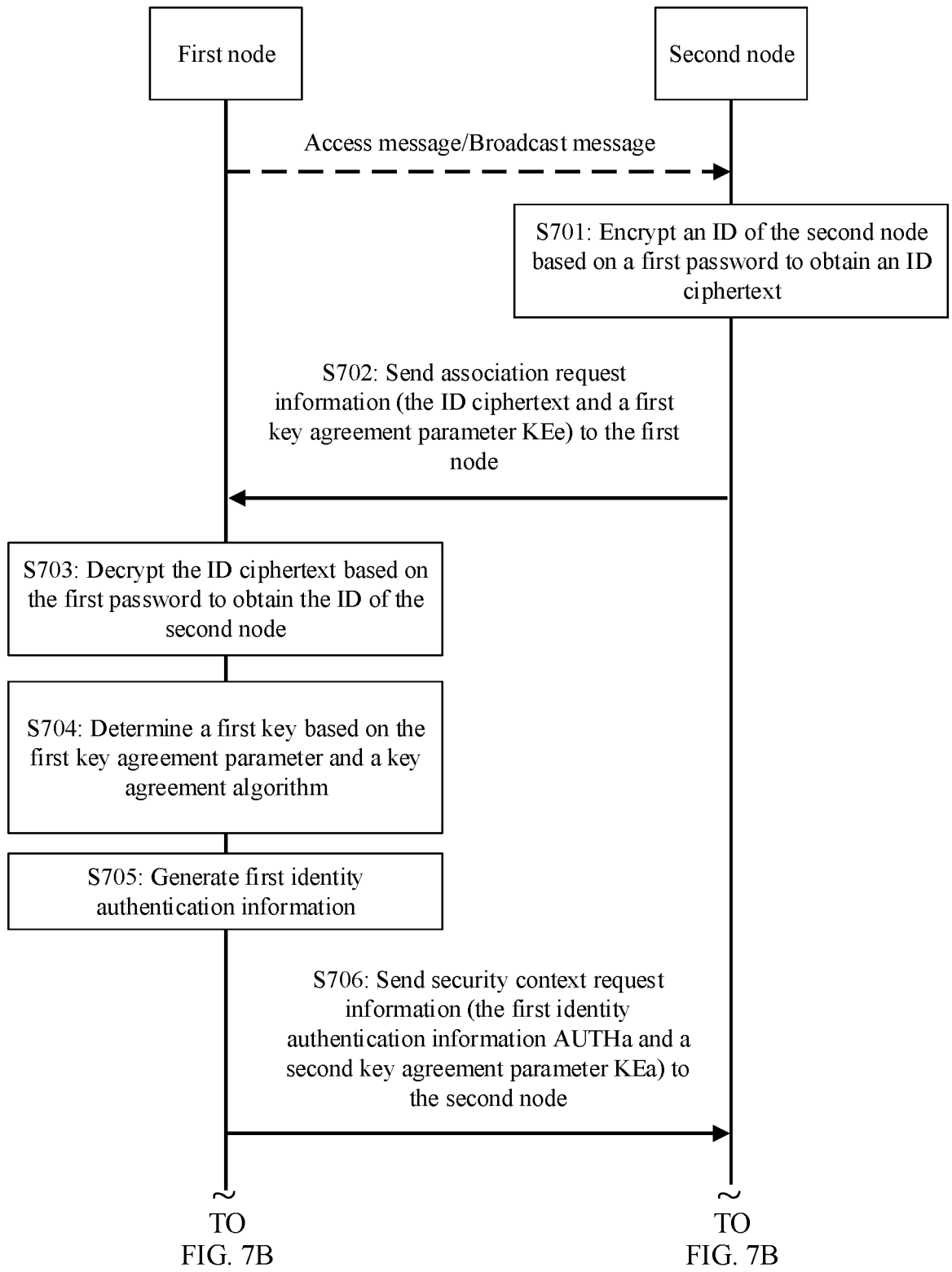
FIG. 7A and FIG. 7B are a schematic flowchart of still another communication method according to an embodiment of the present disclosure.
Figure 7B:
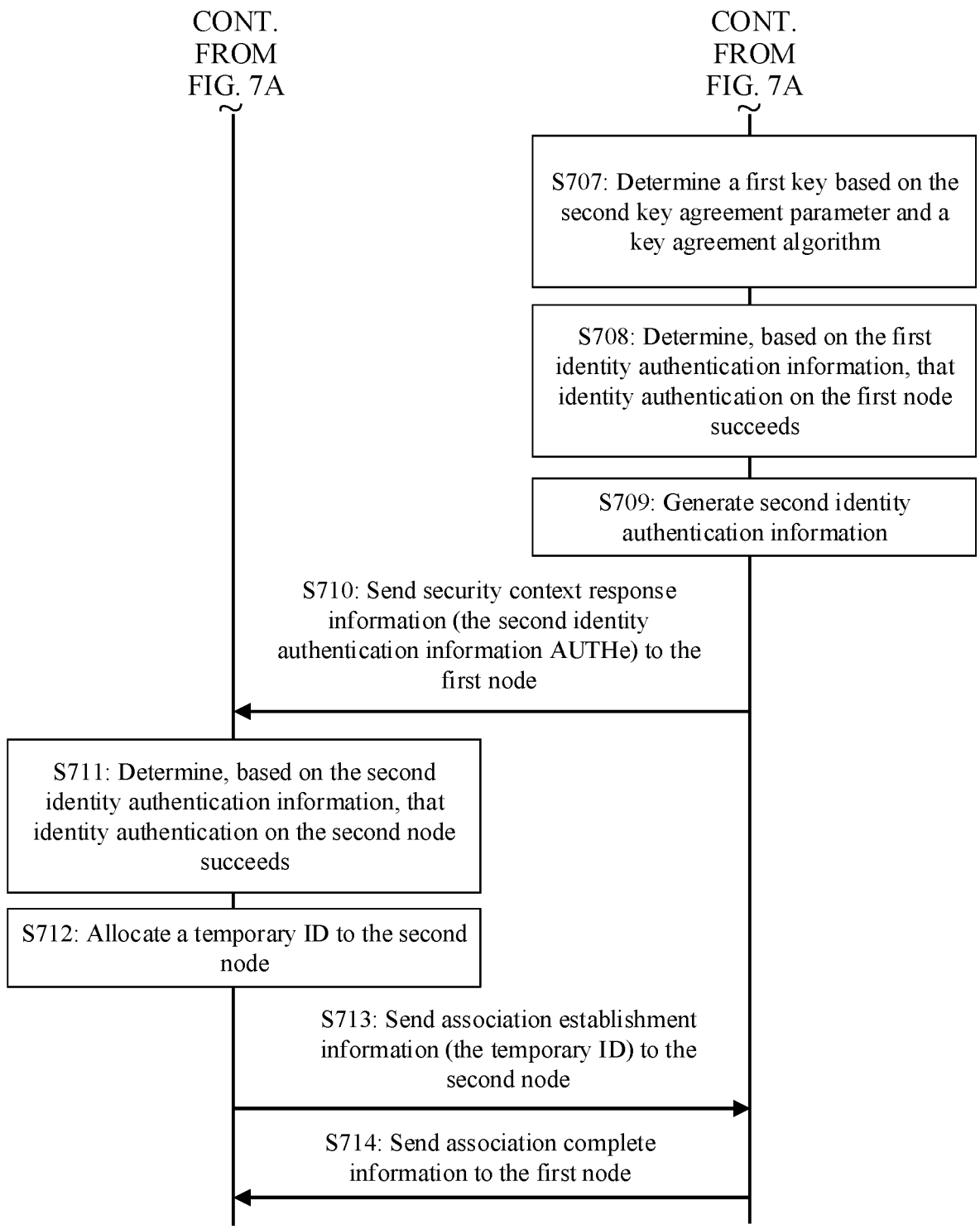

FIG. 7A and FIG. 7B are a schematic diagram of another possible communication method according to an embodiment of the present disclosure. The method includes at least the following steps.

Step S701: A second node encrypts an ID of the second node based on a first password to obtain an ID ciphertext.

Specifically, the second node may encrypt the ID of the second node based on the first password to obtain the ID ciphertext in at least the following several possible implementations.

Implementation 1: The second node encrypts the ID of the second node based on the first password by using an encryption algorithm, to obtain the ID ciphertext. Specifically, the second node generates the ID ciphertext IDc based on the first password PW by using the encryption algorithm Enc. For example, IDc=Enc(PW, IDe), where Enc may be one or more of the following algorithms: AES, DES, 3DES, AES-CCM, AES-GCM, and the like.

Implementation 2: The second node generates a first protection key based on the first password, and encrypts the ID of the second node based on the first protection key to obtain the ID ciphertext.

Further, optionally, the second node may generate a first protection key by using the first password and a hash algorithm, and encrypt the ID of the second node by using the first protection key. The first protection key may also be understood as a hash value of the first password. For example, the first protection key K1 meets the following: K1=hash(PW). Further, the ID ciphertext IDc is generated according to the following formula: IDc=Enc(K1, IDe).

Alternatively, the second node may generate a first protection key based on the first password and a KDF. Further, optionally, another parameter like a freshness parameter may be further used to generate the first protection key. For example, K1=KDF(PW, fresh).

It should be noted that how to obtain the first protection key is explained by using two steps herein to more clearly describe the solution. During actual processing, the first protection key may alternatively be obtained in one step. The first protection key K1 is merely an intermediate result. For example, the ID ciphertext IDc is determined according to the following formula: IDc=Enc(KDF(PW, fresh), IDe).

Step S702: The second node sends association request information to the first node.

Specifically, the association request information includes the ID ciphertext. The second node sends the association request information to the first node, and correspondingly, the first node receives the association request information from the second node, to obtain content in the association request information.

Optionally, the association request information may further include a first key agreement parameter, and the first key agreement parameter may be generated based on a key agreement algorithm, or may be obtained according to a preconfigured or predefined calculation method.

Further, optionally, the association request information further includes a first freshness parameter. For example, the first freshness parameter may be a nonce NONCEe determined by the second node.

Optionally, the association request information further includes first indication information, and the first indication information indicates that the association request information includes the ID ciphertext. Optionally, the first indication information may be a first field included in the first information. For example, a value "0" of the first field indicates that the first information includes the ID ciphertext. In this way, the first node can determine, by parsing the first information, whether to perform a step of decrypting the ID ciphertext. Further, a value "1" of the first field indicates that the first information includes the temporary ID. For another example, the first information may include an ID type, and the ID type may be one or more of an ID ciphertext, a temporary ID, and the like.

Optionally, the association request information further includes a PSK ID, and the PSK ID is an ID corresponding to a PSK shared by the first node and the second node. Further, when the ID ciphertext is obtained through encryption based on the PSK, the first node may determine, based on the PSK ID in the association request information, the PSK shared with the second node, and then decrypt the ID ciphertext by using the PSK to obtain the ID of the second node.

Optionally, the association request information further includes an ID corresponding to the first password. In a possible design, different passwords correspond to different password IDs, and the first password used for decrypting the first ciphertext may be determined based on the ID corresponding to the first password. Further, different passwords may correspond to different permission control. Therefore, the first node may determine the first password based on the ID corresponding to the first password, and further determine permission information corresponding to the second node, and the like.

Step S703: The first node decrypts the ID ciphertext based on the first password to obtain the ID of the second node.

Specifically, because the ID ciphertext corresponds to the first password and the ID of the second node, the first node may determine the ID of the second node based on the first password and the ID ciphertext.

In an implementation, according to a stipulation in a protocol, the first node decrypts the ID key to obtain the ID of the second node in a manner corresponding to a manner of encrypting, by the second node, the ID of the second node to obtain the ID ciphertext. Specifically, the first node may decrypt the ID ciphertext based on the first password to obtain the ID of the second node in at least the following several possible implementations.

Implementation 1: The first node decrypts the ID ciphertext based on the first password PW by using a decryption algorithm (a specific algorithm may be the same as the encryption algorithm), to obtain the ID of the second node. For example, IDe=Dec(PW, IDc), where Dec may be one or more of the following algorithms: AES, DES, 3DES, AES-CCM, AES-GCM, and the like.

Implementation 2: The first node determines the first protection key based on the first password, and decrypts the ID ciphertext based on the first protection key to obtain the ID of the second node.

Further, optionally, the first node may generate a first protection key based on the first password and a hash algorithm, and decrypt the ID ciphertext by using the first protection key. The first protection key may also be understood as a hash value of the PSK. For example, the first protection key K1 meets the following: K1=hash(PW). For example, the ID ciphertext IDc is decrypted to obtain the ID of the second node according to the following formula: IDe=Dec(K1, IDc).

For a specific implementation, refer to specific descriptions in step S403.

Optionally, the communication method may include step S704 to step S713. For specific implementations of step S704 to step S713, refer to descriptions of corresponding steps in step S505 to step S515. Step S704 to step S713 are specifically as follows.

Step S704: The first node determines a first key based on the first key agreement parameter and a key agreement algorithm.

Step S705: The first node generates first identity authentication information based on the first key.

Step S706: The first node sends security context request information to the second node.

Step S707: The second node determines a first key based on a second key agreement parameter and a key agreement algorithm.

Step S708: The second node determines, based on the first identity authentication information, that identity authentication on the first node succeeds.

Step S709: The second node generates second identity authentication information.

Step S710: The second node sends security context response information to the first node.

Step S711: The first node determines, based on the second identity authentication information, that identity authentication on the second node succeeds.

Step S712: The first node allocates a temporary ID to the second node.

Step S713: The first node sends association establishment information to the second node.

For a specific implementation, refer to related descriptions in step S404.

Step S714: The second node sends association complete information to the first node.

Specifically, the association complete information indicates that association is completed, or includes information used to indicate that association is completed. The second node sends the association complete information to the first node, and correspondingly, the first node receives the association complete information from the second node.

In the embodiment shown in FIG. 7A and FIG. 7B, the second node may encrypt the ID of the second node based on the first password, so that the first node can decrypt the ID ciphertext based on the first password to obtain the ID of the second node. A node that obtains the first password is usually trusted, and therefore communication security can be ensured. During subsequent communication, a temporary ID may be used to indicate an identity of the second node, to avoid leakage of the real ID of the node and improve data security.

The foregoing describes in detail the methods in embodiments of the present disclosure. The following provides an apparatus in embodiments of the present disclosure.

Figure 8:
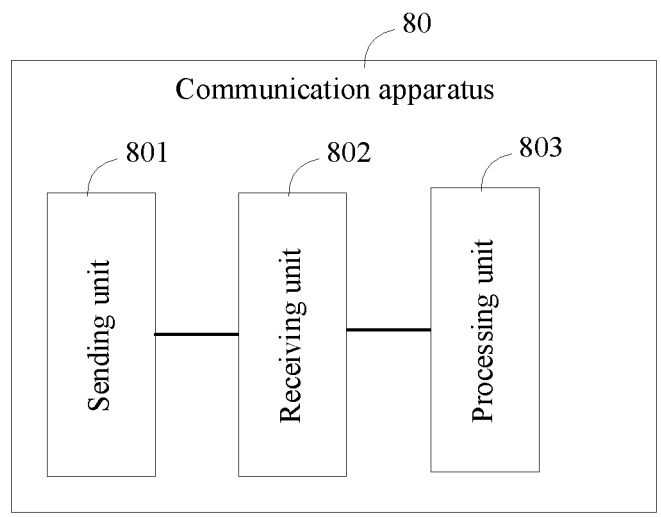
FIG. 8 is a schematic diagram of a structure of a communication apparatus according to an embodiment of the present disclosure.

FIG. 8 is a schematic diagram of a structure of a communication apparatus 80 according to an embodiment of the present disclosure. The apparatus 80 may be a node, or may be a component in a node, for example, a chip or an integrated circuit. The apparatus 80 may include a sending unit 801, a receiving unit 802, and a processing unit 803. The communication apparatus 80 is configured to implement the foregoing communication methods, for example, the communication method in the embodiment shown in FIG. 3, or FIG. 5A and FIG. 5B.

In a possible implementation, the sending unit 801 is configured to send a first public key and a signature of the first public key; the receiving unit 802 is configured to receive first information (association request information) from a second node (a T node), where the first information includes an identification ID ciphertext, and the ID ciphertext corresponds to the first public key and the ID of the second node; the processing unit 803 is configured to decrypt the ID ciphertext based on a first private key corresponding to the first public key, to obtain the ID of the second node; and the sending unit 801 is further configured to send second information (association establishment information) to the second node, where the second information includes a temporary ID corresponding to the second node, and the temporary ID is used to temporarily indicate an identity of the second node.

In this embodiment of the present disclosure, the second node may protect the ID by using the first public key to obtain the ID ciphertext, so that the real ID is not directly transmitted, and a source and integrity of the first public key may be protected by using the signature of the first public key. Further, the second node may verify the first public key based on the signature of the first public key, and then transmit the ID by "using a public key for encryption and using a private key for decryption". In this way, the communication apparatus 80 can obtain the real ID of the second node by decrypting the ID ciphertext. During subsequent communication, a temporary ID may be used to indicate an identity of the second node, to avoid leakage of the real ID of the node and improve data security.

In another possible implementation, the first public key is a temporary public key, and the first private key is a temporary private key.

It can be learned that a lifetime of the temporary key is usually short, and the temporary key is less likely to be cracked compared with a long-term key. Therefore, the real ID can be encrypted by using the temporary public key to improve secrecy of the real ID. In addition, because a long-term key is usually used for a long period of time, all communication data that uses the key is affected when the long-term key is cracked, without forward secrecy. However, because the temporary key usually has a short lifetime, security of communication data that appears before the temporary key is used is not affected even if the temporary key is cracked. This improves data security.

In another possible implementation, the first public key is a one-time public key, and the first private key is a one-time private key.

It can be learned that the first public key and the first private key used in this embodiment of the present disclosure may be one-time keys, that is, are used to encrypt and decrypt only the ID. For example, after the ID ciphertext is decrypted by using the first private key, the first private key may be deleted, so that the private key is not likely to be cracked. This avoids leakage of the real ID of the node and improves data security.

In another possible implementation, the processing unit 803 is further configured to sign the first public key based on a private key corresponding to a DC, to obtain the signature of the first public key; and the sending unit 801 is further configured to send the DC to the second node.

It can be learned that the DC can be used to verify a source of the first public key. For example, the certificate authority center generates a DC for a public key PK and some information (e.g., description information of the first node) of the first node, and the second node may determine that the source of the first public key is the first node based on a key pair (that is, a private key SK corresponding to the public key PK) corresponding to the DC and by "using a private key for signing and using a public key for signature verification".

In a specific implementation, the first node has a long-term key pair (a long-term public key PK and a long-term private key SK). The CA center performs certification on the long-term public key PK, and the CA center encrypts the long-term public key PK together with some related information (e.g., description information of the first node) by using a private key cpk of the CA center to generate a DC. The first node generates a signature of the first public key by using a private key corresponding to the certificate, and sends the first public key, the signature of the first public key, and the DC to the second node. The second node decrypts the certificate by using a public key csk of the CA center, and may determine that the DC is issued by the CA, and determine that the long-term public key PK in the DC is a public key of the first node. In this way, the second node authenticates a source of the long-term public key PK. The second node verifies the signature of the first public key by using the long-term public key, and determines that the first public key comes from the first node, and therefore encrypts the ID by using the first public key.

In another possible implementation, the first information further includes first indication information, and the first indication information indicates that the association request information includes the ID ciphertext.

In another possible implementation, the processing unit 803 is further configured to: determine that identity authentication on the second node succeeds; and allocate the temporary ID to the second node.

In another possible implementation, the first information further includes a first key agreement parameter, and the processing unit is further configured to determine a first key based on the first key agreement parameter and a key agreement algorithm; the sending unit 801 is further configured to send third information to the second node, where the third information includes first identity authentication information and a second key agreement parameter, and the first identity authentication information is used for identity authentication on the first node; the receiving unit 802 is further configured to receive fourth information from the second node, where the fourth information includes second identity authentication information; and the processing unit 803 is further configured to determine, based on the first key and the second identity authentication information, that identity authentication on the second node succeeds.

It can be learned that the communication apparatus may generate the first key through key agreement, and generate the first identity authentication information by using the first key, where the first identity authentication information is used by the second node to verify an identity. Further, the communication apparatus may alternatively verify the identity of the second node by using the second identity authentication information. When an attacker attempts to use the identification of the second node, the attacker cannot forge the first key and therefore cannot pass identity verification. This avoids communication with an untrusted node and improves data security of the node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation, the receiving unit 802 is further configured to receive fifth information from the second node, where the fifth information indicates that association is completed, and further, the fifth information may be referred to as association complete information (which may also be referred to as an association complete message in a specific scenario).

It should be noted that, for implementations of the units, reference may be further made to corresponding descriptions in the embodiment shown in FIG. 3, or FIG. 5A and FIG. 5B. The communication apparatus 80 may be the first node in the embodiment shown in FIG. 3, or FIG. 5A and FIG. 5B.

It should be understood that, in the apparatus embodiments of the present disclosure, division into a plurality of units or modules is merely logical division based on functions, and is not construed as a limitation on a specific structure of the apparatus. During specific implementation, some functional modules may be further divided into more finer-grained functional modules, or some functional modules may be combined into one functional module. However, regardless of whether the functional modules are further divided or combined, general processes performed by the apparatus 80 during data communication are the same. For example, the receiving unit 802 and the sending unit 801 in the apparatus 80 may alternatively be integrated into a communication unit, and the communication unit may implement the functions implemented by the receiving unit 802 and the sending unit 801. Usually, each unit corresponds to respective program code (in other words, program instructions). When the program code corresponding to the unit runs on the processor, the unit is controlled by the processing unit to perform a corresponding process to implement a corresponding function.

Figure 9:
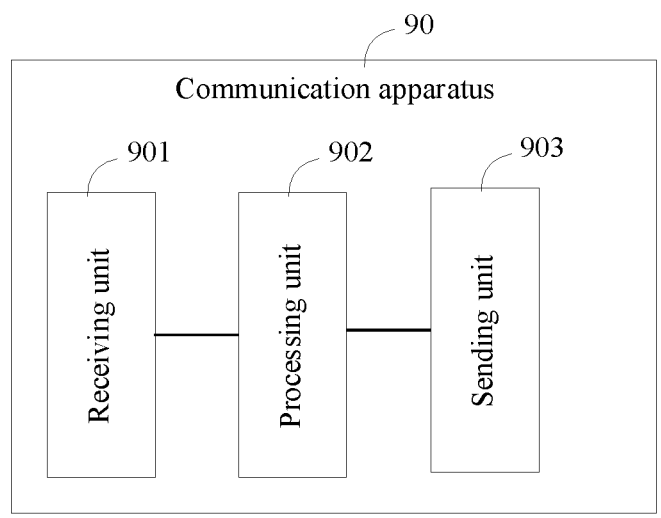
FIG. 9 is a schematic diagram of a structure of another communication apparatus according to an embodiment of the present disclosure.

FIG. 9 is a schematic diagram of a structure of a communication apparatus 90 according to an embodiment of the present disclosure. The apparatus 90 may be a node, or may be a component in a node, for example, a chip or an integrated circuit. The apparatus 90 may include a receiving unit 901, a processing unit 902, and a sending unit 903. The communication apparatus 90 is configured to implement the foregoing communication methods, for example, the communication method in the embodiment shown in FIG. 4, FIG. 6A and FIG. 6B, or FIG. 7A and FIG. 7B.

In a possible implementation, the receiving unit 901 is configured to receive first information from a second node, where the first information includes an identification ID ciphertext, and the ID ciphertext corresponds to a first protection key and an ID of the second node; the processing unit 902 is configured to determine the first protection key based on a security parameter, where the security parameter is a pre-shared key PSK between a first node and the second node or a first password of the first node; the processing unit 902 is further configured to decrypt the ID ciphertext based on the first protection key to obtain the ID of the second node; and the sending unit 903 is configured to send second information to the second node, where the second information includes a temporary ID corresponding to the second node, and the temporary ID is used to temporarily indicate an identity of the second node.

It can be learned that the PSK shared with the first node is predefined, preconfigured, or pre-generated in the second node. Therefore, a real ID may be encrypted by using the PSK. Correspondingly, the communication apparatus 90 may decrypt the ID ciphertext based on the PSK to obtain the real ID of the second node, so as to determine the identity of the second node. During subsequent communication, a temporary ID may be used to indicate an identity of the second node, to avoid leakage of the real ID of the node and improve data security.

The first password of the first node may be considered as an access password of the first node, and may be specifically a password preconfigured or predefined in the first node to enable the second node to access the first node, or a secrecy value agreed upon between the first node and the second node. For example, in a scenario in which a mobile phone accesses a router that supports the Wi-Fi protocol, the mobile phone terminal may access the router by using a "Wi-Fi password", and the "Wi-Fi password" may be understood as a first password of the router.

It can be learned that the second node may encrypt the ID of the second node based on the first password, so that the communication apparatus 90 can decrypt the ID ciphertext based on the first password to obtain the ID of the second node. A node that obtains the first password is usually trusted, and therefore communication security can be ensured. During subsequent communication, a temporary ID may be used to indicate an identity of the second node, to avoid leakage of the real ID of the node and improve data security.

In another possible implementation, the processing unit 902 is further configured to: determine the first protection key based on the security parameter and a first freshness parameter.

The foregoing describes a decryption method. Because the first protection key used for decryption corresponds to a first protection key used for encryption, the first protection key used for encryption is also generated based on the security parameter and the first freshness parameter. In an encryption process, because a value of the freshness parameter varies at different moments, a first protection key for encrypting an ID of the first node varies each time. This improves secrecy of a group key.

In another possible implementation, the processing unit 902 is further configured to: determine the first protection key based on the security parameter and a cryptographic algorithm.

In another possible implementation, the cryptographic algorithm includes at least a hash algorithm and/or a KDF. For example, the first protection key K1 is obtained based on a password PW of the first node by using the hash algorithm.

Specifically, for example, K1=hash(PW). For another example, the first protection key K1 is obtained based on a hash value of a password PW of the first node and the first freshness parameter fresh1 by using the KDF. Specifically, for example, K1=KDF(hash(PW, fresh1)).

In another possible implementation, the first freshness parameter is a first nonce.

In another possible implementation, the security parameter is the pre-shared key PSK between the first node and the second node, the PSK corresponds to a first PSK ID, and the first information further includes the first PSK ID.

In another possible implementation, the first information further includes first indication information, and the first indication information indicates that the association request information includes the ID ciphertext.

In another possible implementation, the processing unit 902 is further configured to: determine that identity authentication on the second node succeeds; and allocate the temporary ID to the second node.

In another possible implementation, the first information further includes a first key agreement parameter, and the processing unit 902 is further configured to determine a first key based on the first key agreement parameter and a key agreement algorithm; the sending unit is further configured to send third information to the second node, where the third information includes first identity authentication information and a second key agreement parameter, and the first identity authentication information is used for identity authentication on the first node; the receiving unit 901 is further configured to receive fourth information from the second node, where the fourth information includes second identity authentication information; and the processing unit 902 is further configured to determine, based on the first key and the second identity authentication information, that identity authentication on the second node succeeds.

It can be learned that the communication apparatus 90 may generate the first key through key agreement, and generate the first identity authentication information by using the first key, where the first identity authentication information is used by the second node to verify an identity. Further, the communication apparatus 90 may alternatively verify the identity of the second node by using the second identity authentication information. When an attacker attempts to use the identification of the second node, the attacker cannot forge the first key and therefore cannot pass identity verification. This avoids communication with an untrusted node and improves data security of the node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation, the receiving unit 901 is further configured to receive fifth information from the second node, where the fifth information indicates that association is completed, and further, the fifth information may be referred to as association complete information (which may also be referred to as an association complete message in a specific scenario).

It should be noted that, for implementations of the units, reference may be further made to corresponding descriptions in the embodiment shown in FIG. 4, FIG. 6A and FIG. 6B, or FIG. 7A and FIG. 7B. The communication apparatus 90 may be the first node in the embodiment shown in FIG. 4, FIG. 6A and FIG. 6B, or FIG. 7A and FIG. 7B.

Figure 10:
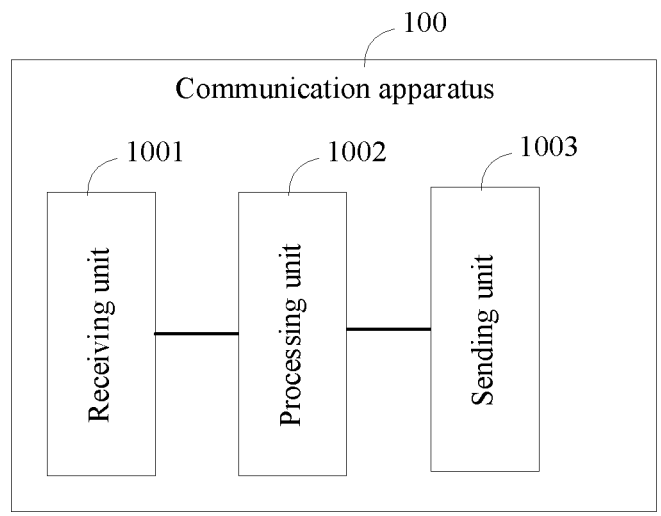
FIG. 10 is a schematic diagram of a structure of still another communication apparatus according to an embodiment of the present disclosure.

FIG. 10 is a schematic diagram of a structure of a communication apparatus 100 according to an embodiment of the present disclosure. The apparatus 100 may be a node, or may be a component in a node, for example, a chip or an integrated circuit. The apparatus 100 may include a receiving unit 1001, a processing unit 1002, and a sending unit 1003. The communication apparatus 100 is configured to implement the foregoing communication methods, for example, the communication method in the embodiment shown in FIG. 3, or FIG. 5A and FIG. 5B.

In a possible implementation, the receiving unit 1001 is configured to receive a first public key and a signature of the first public key from a first node; the processing unit 1002 is configured to determine, based on the signature of the first public key, that integrity verification on the first public key succeeds; the sending unit 1003 is configured to send first information to the first node, where the first information includes the identification ID ciphertext, and the ID ciphertext is obtained by encrypting the ID of the second node by using the first protection key; and the receiving unit 1001 is further configured to receive second information (association establishment information) from the first node, where the second information includes a temporary ID corresponding to the ID of the second node, and the temporary ID is used to temporarily indicate an identity of the second node.

In this embodiment of the present disclosure, the communication apparatus 100 may protect the ID by using the first public key to obtain the ID ciphertext, so that a real ID is not directly transmitted, and a source and integrity of the first public key may be protected by using the signature of the first public key. Further, the communication apparatus 100 may verify the first public key based on the signature of the first public key, and then transmit the ID by "using a public key for encryption and using a private key for decryption". In this way, the first node can obtain the real ID of the second node by decrypting the ID ciphertext. During subsequent communication, a temporary ID may be used to indicate an identity of the second node, to avoid leakage of the real ID of the node and improve data security.

During specific implementation, the first information may also be referred to as association request information (which may also be referred to as an association request message in a specific scenario), and the second information may also be referred to as association establishment information (which may also be referred to as an association establishment message in a specific scenario).

In a possible implementation, the first public key is a temporary public key.

In another possible implementation, the first public key is a one-time public key.

In another possible implementation, the receiving unit 1001 is further configured to receive a digital certificate DC from the first node; and the processing unit 1002 is further configured to determine, based on the signature of the first public key and a public key corresponding to the DC, that verification on the first public key succeeds.

In another possible implementation, the first information further includes first indication information, and the first indication information indicates that the association request includes the ID ciphertext.

In another possible implementation, the receiving unit 1001 is further configured to receive third information from the first node, where the third information includes first identity authentication information and a second key agreement algorithm parameter; the processing unit 1002 is further configured to determine a first key based on the second key agreement algorithm parameter and a key agreement algorithm; the processing unit 1002 is further configured to determine, based on the first key and the first identity authentication information, that identity authentication on the first node succeeds; and the sending unit 1003 is further configured to send fourth information to the first node, where the fourth information includes second identity authentication information, and the second identity authentication information is used to authenticate an identity of the second node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation, the sending unit 1003 is further configured to send fifth information to the first node, where the fifth information indicates that association is completed, and further, the fifth information may be referred to as association complete information (which may also be referred to as an association complete message in a specific scenario).

It should be noted that, for implementations of the units, reference may be further made to corresponding descriptions in the embodiment shown in FIG. 3, or FIG. 5A and FIG. 5B. The communication apparatus 100 may be the second node in the embodiment shown in FIG. 3, or FIG. 5A and FIG. 5B.

Figure 11:
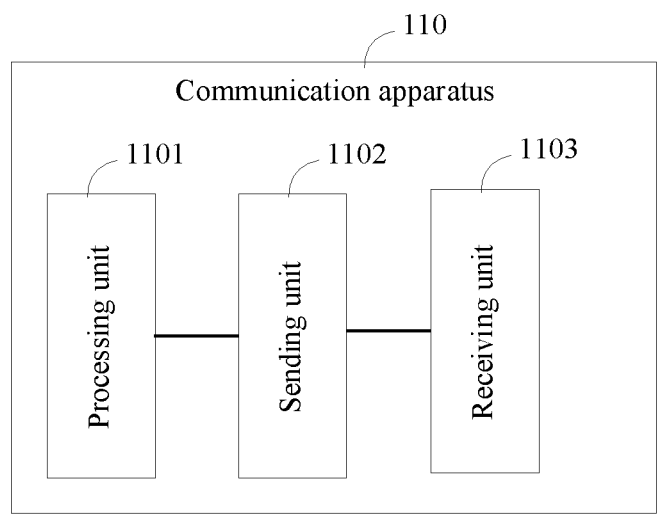
FIG. 11 is a schematic diagram of a structure of still another communication apparatus according to an embodiment of the present disclosure.

FIG. 11 is a schematic diagram of a structure of a communication apparatus 110 according to an embodiment of the present disclosure. The apparatus 110 may be a node, or may be a component in a node, for example, a chip or an integrated circuit. The apparatus 110 may include a processing unit 1101, a sending unit 1102, and a receiving unit 1103. The communication apparatus 110 is configured to implement the foregoing communication methods, for example, the communication method in the embodiment shown in FIG. 4, FIG. 6A and FIG. 6B, or FIG. 7A and FIG. 7B.

In a possible implementation, the processing unit 1101 is configured to determine the first protection key based on a security parameter, where the security parameter is a pre-shared key PSK between a first node and the second node or a first password of the first node; the processing unit 1101 is further configured to encrypt an identification ID of the second node based on the first protection key to obtain an ID ciphertext; the sending unit 1102 is configured to send first information to the first node, where the first information includes the identification ID ciphertext, and the ID ciphertext is obtained by encrypting the ID of the second node by using the first protection key; and the receiving unit 1103 is configured to receive second information from the first node, where the second information includes a temporary ID corresponding to the second node, and the temporary ID is used to temporarily indicate an identity of the second node.

It can be learned that the PSK shared with the first node is predefined, preconfigured, or pre-generated in the second node. Therefore, the communication apparatus may encrypt a real ID by using the PSK. Correspondingly, the first node may decrypt the ID ciphertext based on the PSK to obtain the real ID of the second node, so as to determine the identity of the second node. During subsequent communication, a temporary ID may be used to indicate an identity of the second node, to avoid leakage of the real ID of the node and improve data security.

In a possible implementation, the processing unit 1101 is further configured to: determine the first protection key based on the security parameter and a first freshness parameter. In another possible implementation, the processing unit 1101 is further configured to: determine the first protection key based on the security parameter and a cryptographic algorithm.

In another possible implementation, the cryptographic algorithm includes at least a hash algorithm and/or a KDF. For example, the first protection key K1 is obtained based on a password PW of the first node by using the hash algorithm. Specifically, for example, K1=hash(PW). For another example, the first protection key K1 is obtained based on a hash value of a password PW of the first node and the first freshness parameter fresh1 by using the KDF. Specifically, for example, K1=KDF(hash(PW, fresh1)).

In another possible implementation, the first freshness parameter is a first nonce.

In another possible implementation, the security parameter is the pre-shared key PSK between the first node and the second node, the PSK corresponds to a first PSK ID, and the first information further includes the first PSK ID.

In another possible implementation, the first information further includes first indication information, and the first indication information indicates that the association request includes the ID ciphertext.

In another possible implementation, the receiving unit 1103 is further configured to receive third information from the first node, where the third information includes first identity authentication information and a second key agreement algorithm parameter; the processing unit 1101 is further configured to determine a first key based on the second key agreement algorithm parameter and a key agreement algorithm; the processing unit 1101 is further configured to determine, based on the first key and the first identity authentication information, that identity authentication on the first node succeeds; and the sending unit 1102 is further configured to send fourth information to the first node, where the fourth information includes second identity authentication information, and the second identity authentication information is used to authenticate an identity of the second node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation, the sending unit 1102 is further configured to send fifth information to the first node, where the fifth information indicates that association is completed, and further, the fifth information may be referred to as association complete information (which may also be referred to as an association complete message in a specific scenario).

It should be noted that, for implementations of the units, reference may be further made to corresponding descriptions in the embodiment shown in FIG. 4, FIG. 6A and FIG. 6B, or FIG. 7A and FIG. 7B. The communication apparatus 110 may be the second node in the embodiment shown in FIG. 4, FIG. 6A and FIG. 6B, or FIG. 7A and FIG. 7B.

Figure 12:
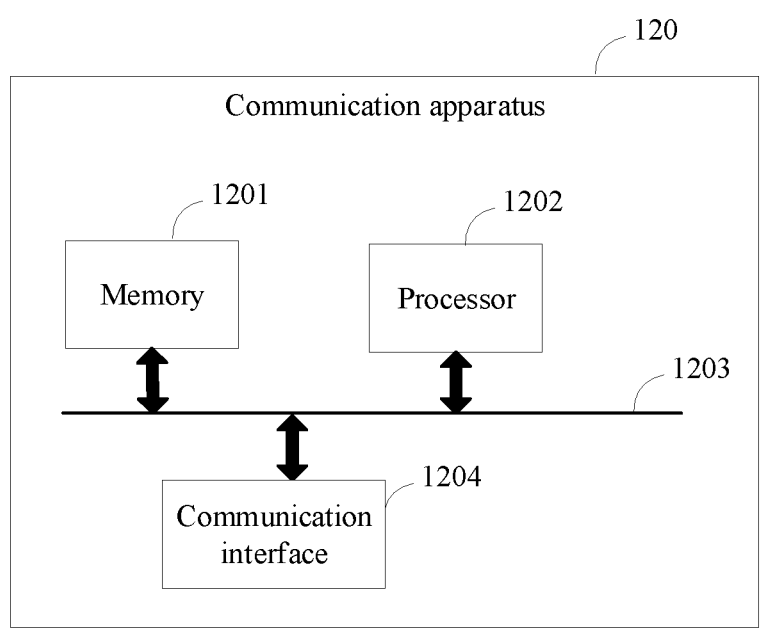
FIG. 12 is a schematic diagram of a structure of still another communication apparatus according to an embodiment of the present disclosure.

FIG. 12 is a schematic diagram of a structure of a communication apparatus 120 according to an embodiment of the present disclosure. The communication apparatus 120 may be a node, or may be a component in a node, for example, a chip or an integrated circuit. The apparatus 120 may include at least one processor 1202 and a communication interface 1204. Further, optionally, the communication apparatus may further include at least one memory 1201.

Further, optionally, a bus 1203 may be included. The memory 1201, the processor 1202, and the communication interface 1204 are connected through the bus 1203.

The memory 1201 is configured to provide storage space, and the storage space may store data such as an operating system and a computer program. The memory 1201 may be one or a combination of a random access memory (RAM), a read-only memory (ROM), an erasable programmable read-only memory (EPROM), a compact disc read-only memory (CD-ROM), and the like.

The processor 1202 is a module for performing an arithmetic operation and/or a logic operation, and may be specifically one or a combination of processing modules such as a central processing unit (CPU), a graphics processing unit (GPU), a microprocessor unit (MPU), an application-specific integrated circuit (ASIC), a field programmable gate array (FPGA), a complex programmable logic device (CPLD), a coprocessor (assisting the central processing unit in corresponding processing and application), and a microcontroller unit (MCU).

The communication interface 1204 may be configured to provide an information input or output for the at least one processor; and/or the communication interface may be configured to receive data sent from an external environment and/or send data to an external environment. The communication interface may be an interface of a wired link, including an Ethernet cable or the like; or may be an interface of a wireless link (Wi-Fi, Bluetooth, universal wireless transmission, a vehicle-mounted short-range communication technology, or the like). Optionally, the communication interface 1204 may further include a transmitter (e.g., a radio frequency transmitter or an antenna), a receiver, or the like that is coupled to the interface.

The processor 1202 in the apparatus 120 is configured to read the computer program stored in the memory 1201, and is configured to perform the foregoing communication methods, for example, the communication method described in the embodiment shown in FIG. 3, FIG. 4, FIG. 5A and FIG. 5B, FIG. 6A and FIG. 6B, or FIG. 7A and FIG. 7B.

In a design, the communication apparatus 120 may be the first node in the embodiment shown in FIG. 3, or FIG. 5A and FIG. 5B. The processor 1202 in the apparatus 120 is configured to read the computer program stored in the memory 1201, to perform the following operations: sending a first public key and a signature of the first public key through the communication interface 1204; receiving first information (association request information) from a second node (a T node) through the communication interface 1204, where the first information includes an identification ID ciphertext, and the ID ciphertext corresponds to the first public key and the ID of the second node; decrypting the ID ciphertext based on a first private key corresponding to the first public key, to obtain the ID of the second node; and sending second information (association establishment information) to the second node, where the second information includes a temporary ID corresponding to the second node, and the temporary ID is used to temporarily indicate an identity of the second node.

In this embodiment of the present disclosure, the second node may protect the ID by using the first public key to obtain the ID ciphertext, so that the real ID is not directly transmitted, and a source and integrity of the first public key may be protected by using the signature of the first public key. Further, the second node may verify the first public key based on the signature of the first public key, and then transmit the ID by "using a public key for encryption and using a private key for decryption". In this way, the communication apparatus 120 can obtain the real ID of the second node by decrypting the ID ciphertext. During subsequent communication, a temporary ID may be used to indicate an identity of the second node, to avoid leakage of the real ID of the node and improve data security.

In another possible implementation, the first public key is a temporary public key, and the first private key is a temporary private key.

It can be learned that a lifetime of the temporary key is usually short, and the temporary key is less likely to be cracked compared with a long-term key. Therefore, the real ID can be encrypted by using the temporary public key to improve secrecy of the real ID. In addition, because a long-term key is usually used for a long period of time, all communication data that uses the key is affected when the long-term key is cracked, without forward secrecy. However, because the temporary key usually has a short lifetime, security of communication data that appears before the temporary key is used is not affected even if the temporary key is cracked. This improves data security.

In another possible implementation, the first public key is a one-time public key, and the first private key is a one-time private key.

It can be learned that the first public key and the first private key used in this embodiment of the present disclosure may be one-time keys, that is, are used to encrypt and decrypt only the ID. For example, after the ID ciphertext is decrypted by using the first private key, the first private key may be deleted, so that the private key is not likely to be cracked. This avoids leakage of the real ID of the node and improves data security.

In another possible implementation, the processor 1202 is further configured to: sign the first public key based on a private key corresponding to a DC, to obtain the signature of the first public key; and send the DC to the second node through the communication interface 1204.

It can be learned that the DC can be used to verify a source of the first public key. For example, the certificate authority center generates a DC for a public key PK and some information (e.g., description information of the first node) of the first node, and the second node may determine that the source of the first public key is the first node based on a key pair (that is, a private key SK corresponding to the public key PK) corresponding to the DC and by "using a private key for signing and using a public key for signature verification".

In a specific implementation, the first node has a long-term key pair (a long-term public key PK and a long-term private key SK). The CA center performs certification on the long-term public key PK, and the CA center encrypts the long-term public key PK together with some related information (e.g., description information of the first node) by using a private key cpk of the CA center to generate a DC. The first node generates a signature of the first public key by using a private key corresponding to the certificate, and sends the first public key, the signature of the first public key, and the DC to the second node. The second node decrypts the certificate by using a public key csk of the CA center, and may determine that the DC is issued by the CA, and determine that the long-term public key PK in the DC is a public key of the first node. In this way, the second node authenticates a source of the long-term public key PK. The second node verifies the signature of the first public key by using the long-term public key, and determines that the first public key comes from the first node, and therefore encrypts the ID by using the first public key.

In another possible implementation, the first information further includes first indication information, and the first indication information indicates that the association request information includes the ID ciphertext.

In another possible implementation, the processor 1202 is further configured to: determine that identity authentication on the second node succeeds; and allocate the temporary ID to the second node.

In another possible implementation, the first information further includes a first key agreement parameter, and the processor is further configured to: determine a first key based on the first key agreement parameter and a key agreement algorithm; send third information to the second node through the communication interface 1204, where the third information includes first identity authentication information and a second key agreement parameter, and the first identity authentication information is used for identity authentication on the first node; receive fourth information from the second node through the communication interface 1204, where the fourth information includes second identity authentication information; and determine, based on the first key and the second identity authentication information, that identity authentication on the second node succeeds.

It can be learned that the communication apparatus may generate the first key through key agreement, and generate the first identity authentication information by using the first key, where the first identity authentication information is used by the second node to verify an identity. Further, the communication apparatus may alternatively verify the identity of the second node by using the second identity authentication information. When an attacker attempts to use the identification of the second node, the attacker cannot forge the first key and therefore cannot pass identity verification. This avoids communication with an untrusted node and improves data security of the node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation, the processor 1202 is further configured to: receive fifth information from the second node through the communication interface 1204, where the fifth information indicates that association is completed, and further, the fifth information may be referred to as association complete information (which may also be referred to as an association complete message in a specific scenario).

For a specific implementation, refer to detailed descriptions in the embodiment shown in FIG. 3, or FIG. 5A and FIG. 5B.

In a design, the communication apparatus 120 may be the first node in the embodiment shown in FIG. 4, FIG. 6A and FIG. 6B, or FIG. 7A and FIG. 7B. The processor 1202 in the apparatus 120 is configured to read the computer program stored in the memory 1201, to perform the following operations: receiving first information from a second node through the communication interface 1204, where the first information includes an identification ID ciphertext, and the ID ciphertext corresponds to a first protection key and an ID of the second node; determining the first protection key based on a security parameter, where the security parameter is a pre-shared key PSK between a first node and the second node or a first password of the first node; decrypting the ID ciphertext based on the first protection key to obtain the ID of the second node; and sending second information to the second node through the communication interface 1204, where the second information includes a temporary ID corresponding to the second node, and the temporary ID is used to temporarily indicate an identity of the second node.

It can be learned that the PSK shared with the first node is predefined, preconfigured, or pre-generated in the second node. Therefore, a real ID may be encrypted by using the PSK. Correspondingly, the communication apparatus may decrypt the ID ciphertext based on the PSK to obtain the real ID of the second node, so as to determine the identity of the second node. During subsequent communication, a temporary ID may be used to indicate an identity of the second node, to avoid leakage of the real ID of the node and improve data security.

The first password of the first node may be considered as an access password of the first node, and may be specifically a password preconfigured or predefined in the first node to enable the second node to access the first node, or a secrecy value agreed upon between the first node and the second node. For example, in a scenario in which a mobile phone accesses a router that supports the Wi-Fi protocol, the mobile phone terminal may access the router by using a "Wi-Fi password", and the "Wi-Fi password" may be understood as a first password of the router.

It can be learned that the second node may encrypt the ID of the second node based on the first password, so that the ID of the second node can be obtained by decrypting the ID ciphertext based on the first password. A node that obtains the first password is usually trusted, and therefore communication security can be ensured. During subsequent communication, a temporary ID may be used to indicate an identity of the second node, to avoid leakage of the real ID of the node and improve data security.

In another possible implementation, the processor 1202 is further configured to: determine the first protection key based on the security parameter and a first freshness parameter.

The foregoing describes a decryption method. Because the first protection key used for decryption corresponds to a first protection key used for encryption, the first protection key used for encryption is also generated based on the security parameter and the first freshness parameter. In an encryption process, because a value of the freshness parameter varies at different moments, a first protection key for encrypting an ID of the first node varies each time. This improves secrecy of a group key.

In another possible implementation, the processor 1202 is further configured to: determine the first protection key based on the security parameter and a cryptographic algorithm.

In another possible implementation, the cryptographic algorithm includes at least a hash algorithm and/or a KDF. For example, the first protection key K1 is obtained based on a password PW of the first node by using the hash algorithm. Specifically, for example, K1=hash(PW). For another example, the first protection key K1 is obtained based on a hash value of a password PW of the first node and the first freshness parameter fresh1 by using the KDF. Specifically, for example, K1=KDF(hash(PW, fresh1)).

In another possible implementation, the first freshness parameter is a first nonce.

In another possible implementation, the security parameter is the pre-shared key PSK between the first node and the second node, the PSK corresponds to a first PSK ID, and the first information further includes the first PSK ID.

In another possible implementation, the first information further includes first indication information, and the first indication information indicates that the association request information includes the ID ciphertext.

In another possible implementation, the processor 1202 is further configured to: determine that identity authentication on the second node succeeds; and allocate the temporary ID to the second node.

In another possible implementation, the first information further includes a first key agreement parameter, and the processor 1202 is further configured to: determine a first key based on the first key agreement parameter and a key agreement algorithm; send third information to the second node through the communication interface 1204, where the third information includes first identity authentication information and a second key agreement parameter, and the first identity authentication information is used for identity authentication on the first node; receive fourth information from the second node through the communication interface 1204, where the fourth information includes second identity authentication information; and determine, based on the first key and the second identity authentication information, that identity authentication on the second node succeeds.

It can be learned that the communication apparatus may generate the first key through key agreement, and generate the first identity authentication information by using the first key, where the first identity authentication information is used by the second node to verify an identity. Further, the communication apparatus may alternatively verify the identity of the second node by using the second identity authentication information. When an attacker attempts to use the identification of the second node, the attacker cannot forge the first key and therefore cannot pass identity verification. This avoids communication with an untrusted node and improves data security of the node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation, the processor is further configured to: receive fifth information from the second node through the communication interface 1204, where the fifth information indicates that association is completed, and further, the fifth information may be referred to as association complete information (which may also be referred to as an association complete message in a specific scenario).

For a specific implementation, refer to detailed descriptions in the embodiment shown in FIG. 4, FIG. 6A and FIG. 6B, or FIG. 7A and FIG. 7B.

In a design, the communication apparatus 120 may be the second node in the embodiment shown in FIG. 3, or FIG. 5A and FIG. 5B. The processor 1202 in the apparatus 120 is configured to read the computer program stored in the memory 1201, to perform the following operations: receiving a first public key and a signature of the first public key from a first node through the communication interface 1204; determining, based on the signature of the first public key, that integrity verification on the first public key succeeds; sending first information to the first node through the communication interface 1204, where the first information includes an identification ID ciphertext, and the ID ciphertext is obtained by encrypting an ID of the second node by using the first protection key; and the receiving unit is further configured to receive second information (association establishment information) from the first node, where the second information includes a temporary ID corresponding to the ID of the second node, and the temporary ID is used to temporarily indicate an identity of the second node.

In this embodiment of the present disclosure, the communication apparatus 120 may protect the ID by using the first public key to obtain the ID ciphertext, so that a real ID is not directly transmitted, and a source and integrity of the first public key may be protected by using the signature of the first public key. Further, the communication apparatus 120 may verify the first public key based on the signature of the first public key, and then transmit the ID by "using a public key for encryption and using a private key for decryption". In this way, the first node can obtain the real ID of the second node by decrypting the ID ciphertext. During subsequent communication, a temporary ID may be used to indicate an identity of the second node, to avoid leakage of the real ID of the node and improve data security.

During specific implementation, the first information may also be referred to as association request information (which may also be referred to as an association request message in a specific scenario), and the second information may also be referred to as association establishment information (which may also be referred to as an association establishment message in a specific scenario).

In a possible implementation, the first public key is a temporary public key.

In another possible implementation, the first public key is a one-time public key.

In another possible implementation, the processor is further configured to: receive a digital certificate DC from the first node through the communication interface 1204; and the processing unit is further configured to determine, based on the signature of the first public key and a public key corresponding to the DC, that verification on the first public key succeeds.

In another possible implementation, the first information further includes first indication information, and the first indication information indicates that the association request includes the ID ciphertext.

In another possible implementation, the processor 1202 is further configured to: receive third information from the first node through the communication interface 1204, where the third information includes first identity authentication information and a second key agreement algorithm parameter; determine a first key based on the second key agreement algorithm parameter and a key agreement algorithm; determine, based on the first key and the first identity authentication information, that identity authentication on the first node succeeds; and send fourth information to the first node through the communication interface 1204, where the fourth information includes second identity authentication information, and the second identity authentication information is used to authenticate an identity of the second node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation, the processor 1202 is further configured to: send fifth information to the first node through the communication interface 1204, where the fifth information indicates that association is completed, and further, the fifth information may be referred to as association complete information (which may also be referred to as an association complete message in a specific scenario).

For a specific implementation, refer to detailed descriptions in the embodiment shown in FIG. 3, or FIG. 5A and FIG. 5B.

In a design, the communication apparatus 120 may be the second node in the embodiment shown in FIG. 4, FIG. 6A and FIG. 6B, or FIG. 7A and FIG. 7B. The processor 1202 in the apparatus 120 is configured to read the computer program stored in the memory 1201, to perform the following operations: determining a first protection key based on a security parameter, where the security parameter is a pre-shared key PSK between a first node and a second node or a first password of the first node; encrypting an identification ID of the second node based on the first protection key to obtain an ID ciphertext; sending first information to the first node through the communication interface 1204, where the first information includes an identification ID ciphertext, and the ID ciphertext is obtained by encrypting an ID of the second node by using the first protection key; and receiving second information from the first node through the communication interface 1204, where the second information includes a temporary ID corresponding to the second node, and the temporary ID is used to temporarily indicate an identity of the second node.

It can be learned that the PSK shared with the first node is predefined, preconfigured, or pre-generated in the second node. Therefore, the communication apparatus may encrypt a real ID by using the PSK. Correspondingly, the first node may decrypt the ID ciphertext based on the PSK to obtain the real ID of the second node, so as to determine the identity of the second node. During subsequent communication, a temporary ID may be used to indicate an identity of the second node, to avoid leakage of the real ID of the node and improve data security.

In a possible implementation, the processor 1202 is further configured to: determine the first protection key based on the security parameter and a first freshness parameter.

In another possible implementation, the processor 1202 is further configured to: determine the first protection key based on the security parameter and a cryptographic algorithm.

In another possible implementation, the cryptographic algorithm includes at least a hash algorithm and/or a KDF. For example, the first protection key K1 is obtained based on a password PW of the first node by using the hash algorithm. Specifically, for example, K1=hash(PW). For another example, the first protection key K1 is obtained based on a hash value of a password PW of the first node and the first freshness parameter fresh1 by using the KDF. Specifically, for example, K1=KDF(hash(PW, fresh1)).

In another possible implementation, the first freshness parameter is a first nonce.

In another possible implementation, the security parameter is the pre-shared key PSK between the first node and the second node, the PSK corresponds to a first PSK ID, and the first information further includes the first PSK ID.

In another possible implementation, the first information further includes first indication information, and the first indication information indicates that the association request includes the ID ciphertext.

In another possible implementation, the processor 1202 is further configured to: receive third information from the first node through the communication interface 1204, where the third information includes first identity authentication information and a second key agreement algorithm parameter; determine a first key based on the second key agreement algorithm parameter and a key agreement algorithm; determine, based on the first key and the first identity authentication information, that identity authentication on the first node succeeds; and send fourth information to the first node through the communication interface 1204, where the fourth information includes second identity authentication information, and the second identity authentication information is used to authenticate an identity of the second node.

During specific implementation, the third information may also be referred to as security context request information (which may also be referred to as a security context request message in a specific scenario), and the fourth information may also be referred to as security context response information (which may also be referred to as a security context response message in a specific scenario).

In another possible implementation, the processor 1202 is further configured to: send fifth information to the first node through the communication interface 1204, where the fifth information indicates that association is completed, and further, the fifth information may be referred to as association complete information (which may also be referred to as an association complete message in a specific scenario).

For a specific implementation, refer to detailed descriptions in the embodiment shown in FIG. 4, FIG. 6A and FIG. 6B, or FIG. 7A and FIG. 7B.

An embodiment of the present disclosure further provides a computer-readable storage medium. The computer-readable storage medium stores a computer program. When the computer program runs on one or more processors, the method in the embodiment shown in FIG. 3, FIG. 4, FIG. 5A and FIG. 5B, FIG. 6A and FIG. 6B, or FIG. 7A and FIG. 7B is implemented.

An embodiment of the present disclosure further provides a chip system. The chip system includes at least one processor and a communication interface. The communication interface is configured to send and/or receive data. The at least one processor is configured to invoke a computer program stored in at least one memory, to implement the method in the embodiment shown in FIG. 3, FIG. 4, FIG. 5A and FIG. 5B, FIG. 6A and FIG. 6B, or FIG. 7A and FIG. 7B.

Further, the at least one processor may include at least one of a CPU, an MPU, an MCU, or a coprocessor.

An embodiment of the present disclosure further provides a terminal. The terminal may be an intelligent cockpit domain product, a vehicle, or the like. The terminal includes a first node and/or a second node. The first node (e.g., one or more of modules such as a camera, a screen, a microphone, a speaker, a radar, an electronic key, a passive entry passive start system controller, and UE) is the first node in the embodiment shown in FIG. 3, FIG. 4, FIG. 5A and FIG. 5B, FIG. 6A and FIG. 6B, or FIG. 7A and FIG. 7B. The second node (e.g., a base station or a vehicle CDC) is the second node in the embodiment shown in FIG. 3, FIG. 4, FIG. 5A and FIG. 5B, FIG. 6A and FIG. 6B, or FIG. 7A and FIG. 7B.

Further, optionally, the terminal may be an uncrewed aerial vehicle, a robot, a device in a smart home scenario, a device in an intelligent manufacturing scenario, or the like.

An embodiment of the present disclosure further provides a computer program product. When the computer program product runs on one or more processors, the communication method described in the embodiment shown in FIG. 3, FIG. 4, FIG. 5A and FIG. 5B, FIG. 6A and FIG. 6B, or FIG. 7A and FIG. 7B may be implemented.

All or some of the foregoing embodiments may be implemented by software, hardware, firmware, or any combination thereof.

When software is used to implement the embodiments, all or some of the embodiments may be implemented in a form of a computer instruction product.

When the computer instructions are loaded and executed on a computer, all or some of the processes or functions described in embodiments of the present disclosure are implemented. The computer may be a general-purpose computer, a dedicated computer, a computer network, or another programmable apparatus. The computer instructions may be stored in a computer-readable storage medium, or may be transmitted through a computer-readable storage medium. The computer-readable storage medium may be any usable medium accessible to the computer, or a data storage device, like a server or a data center, integrating one or more usable media. The usable medium may be a magnetic medium (e.g., a floppy disk, a hard disk, or a magnetic tape), an optical medium (e.g., a digital video disc (DVD)), a semiconductor medium (e.g., a solid-state drive (SSD)), or the like.

A sequence of the steps in the method embodiments of the present disclosure may be adjusted, or the steps may be combined or removed according to an actual requirement.

The modules in the apparatus embodiments of the present disclosure may be combined, divided, or removed according to an actual requirement.

What is claimed is:

1. A method implemented by a first node, the method comprising:
   receiving, from a second node, first information comprising a pre-shared key (PSK) identifier an identification (ID) ciphertext, a freshness parameter, and a first key agreement parameter, wherein the ID ciphertext corresponds to a protection key and a node ID of the second node;
   determining a PSK between the first node and the second node based on the PSK identifier;
   determining the protection key based the PSK by using a cryptographic algorithm that takes the PSK and the freshness parameter as input parameters;
   decrypting the ID ciphertext based on the protection key to obtain the node ID;
   determining that identity authentication on the second node succeeds by:
      determining a first key based on the first key agreement parameter and a key agreement algorithm;
      sending, to the second node, third information comprising first identity authentication information and a second key agreement parameter, wherein the first identity authentication information is for identity authentication on the first node;
      receiving, from the second node, fourth information comprising second identity authentication information; and
      determining, based on the second identity authentication information, that the identity authentication on the second node succeeds;
   allocating a temporary ID to the second node in response to determining that the identity authentication on the second node succeeds; and
   sending, to the second node, second information comprising the temporary ID corresponding to the second node, wherein the temporary ID temporarily indicates an identity of the second node.

2. The method of claim 1, wherein determining the protection key comprises determining the protection key based on the PSK and a first nonce.

3. The method of claim 1, wherein the temporary ID is valid for specified time period.

4. The method of claim 1, wherein the first information further comprises first indication information indicating that the first information comprises the ID ciphertext.

5. The method of claim 1, further comprising: receiving fifth information from the second node, wherein the fifth information indicates that association is completed.

6. The method of claim 5, wherein the key agreement algorithm is a Diffie-Hellman (DH) algorithm.

7. A first node comprising:
   a memory configured to store instructions; and
   one or more processors coupled to the memory and configured to execute the instructions to cause the first node to:
      receive, from a second node, first information comprising a pre-shared key (PSK) identifier, a first key agreement parameter, a freshness parameter, and an identification (ID) ciphertext, wherein the ID ciphertext corresponds to a protection key and a node ID of the second node;
      determine a PSK between the first node and the second node based on the PSK identifier;
      determine the protection key based on the PSK by using a cryptographic algorithm that takes the PSK and the freshness parameter as input parameters;
      decrypt the ID ciphertext based on the protection key to obtain the node ID;
      determining that identity authentication on the second node succeeds by:
         determining a first key based on the first key agreement parameter and a key agreement algorithm;
         sending, to the second node, third information comprising first identity authentication information and a second key agreement parameter, wherein the first identity authentication information is for identity authentication on the first node;
         receiving, from the second node, fourth information comprising second identity authentication information; and
         determining, based on the second identity authentication information, that the identity authentication on the second node succeeds;
      allocating a temporary ID to the second node in response to determining that the identity authentication on the second node succeeds; and
      send, to the second node, second information comprising the temporary ID corresponding to the second node, wherein the temporary ID temporarily indicates an identity of the second node.

8. The first node of claim 7, wherein the one or more processors are configured to execute the instructions to cause the first node to determine the protection key based on the PSK and a first nonce.

9. The first node of claim 7, wherein the temporary ID is valid for specified time period.

10. The first node of claim 7, wherein the first information further comprises first indication information indicating that the first information comprises the ID ciphertext.

11. The first node of claim 7, wherein the one or more processors are further configured to execute the instructions to cause the first node to receive fifth information from the second node, wherein the fifth information indicates that association is completed.

12. The first node of claim 7, wherein the one or more processors are further configured to execute the instructions to cause the first node to generate the first identity authentication information based on the first key.

13. The first node of claim 7, wherein the cryptographic algorithm comprises at least one of a hash algorithm or a Key Derivation Function (KDF).

14. The first node of claim 7, wherein the key agreement algorithm is a Diffie-Hellman (DH) algorithm.

\* \* \* \* \*